US012272887B2

(12) United States Patent
Chiang et al.

(10) Patent No.: US 12,272,887 B2
(45) Date of Patent: Apr. 8, 2025

(54) ANTENNA

(71) Applicant: MEDIATEK INC., Hsinchu (TW)

(72) Inventors: Chung-Hsin Chiang, Hsinchu (TW); Nai-Chen Liu, Hsinchu (TW); Shih-Huang Yeh, Hsinchu (TW)

(73) Assignee: MEDIATEK INC., Hsinchu (TW)

( * ) Notice: Subject to any disclaimer, the term of this patent is extended or adjusted under 35 U.S.C. 154(b) by 156 days.

(21) Appl. No.: 18/162,007

(22) Filed: Jan. 31, 2023

(65) Prior Publication Data

US 2023/0268656 A1 Aug. 24, 2023

Related U.S. Application Data

(60) Provisional application No. 63/311,516, filed on Feb. 18, 2022.

(51) Int. Cl.

*H01Q 9/16* (2006.01)
*H01Q 1/48* (2006.01)
*H01Q 5/335* (2015.01)
*H01Q 21/26* (2006.01)

(52) U.S. Cl.

CPC ................. *H01Q 9/16* (2013.01); *H01Q 1/48* (2013.01); *H01Q 5/335* (2015.01); *H01Q 21/26* (2013.01)

(58) Field of Classification Search

CPC ............ H01Q 9/16; H01Q 1/48; H01Q 5/335; H01Q 21/26; H01Q 5/385; H01Q 9/0414; H01Q 25/001

See application file for complete search history.

(56) References Cited

U.S. PATENT DOCUMENTS

| | | | |
|---|---|---|---|
| 6,057,802 A | 5/2000 | Nealy et al. | |
| 6,300,906 B1 * | 10/2001 | Rawnick | H01Q 1/38 343/700 MS |
| 9,972,899 B2 | 5/2018 | Jan et al. | |
| 11,437,715 B2 * | 9/2022 | Jiang | H01Q 1/526 |
| 11,652,301 B2 * | 5/2023 | Yang | H01Q 19/005 343/700 MS |
| 2012/0098725 A1 | 4/2012 | Lytle et al. | |
| 2017/0264021 A1 * | 9/2017 | Heyde | H01Q 9/285 |

(Continued)

FOREIGN PATENT DOCUMENTS

TW 201618378 A 5/2016

OTHER PUBLICATIONS

Extended European Search Report dated Jun. 14, 2023, issued in application No. EP 23155858.6.

(Continued)

*Primary Examiner* — Seung H Lee

(74) *Attorney, Agent, or Firm* — McClure, Qualey & Rodack, LLP

(57) ABSTRACT

An antenna is provided. The antenna includes a first radiator positioned at a first level and connected to a ground plane at a second level. In a top view, the first radiator has a first edge, a second edge, a third edge, a fourth edge and a first arc edge. The second edge and the third edge are connected to opposite ends of the first edge. The fourth edge is connected to an end of the third edge opposite to the first edge. The first arc edge with a first radius has opposite ends respectively connected to the second edge and the fourth edge. The first arc edge has a first arc length corresponding to a first central angle, which is less than 90 degrees.

29 Claims, 19 Drawing Sheets

(56) References Cited

U.S. PATENT DOCUMENTS

| | | | | |
|---|---|---|---|---|
| 2018/0261929 | A1* | 9/2018 | Biscontini | H01Q 21/26 |
| 2020/0358169 | A1* | 11/2020 | Wu | H01Q 21/062 |
| 2021/0013610 | A1 | 1/2021 | Chiang et al. | |

OTHER PUBLICATIONS

Chinese language office action dated Apr. 18, 2024, issued in application No. TW 112105776.

* cited by examiner

ANTENNA

CROSS REFERENCE TO RELATED APPLICATIONS

This application claims the benefit of U.S. Provisional Application No. 63/311,516, filed Feb. 18, 2022, the entirety of which is incorporated by reference herein.

BACKGROUND OF THE INVENTION

Field of the Invention

The present invention relates to an antenna, and, in particular, to radiators and conductive parasitic elements of a dipole antenna.

Description of the Related Art

Antennas are essential components of all modern electronic devices that require radio-frequency functionality, such as smartphones, tablet computers, and notebook computers. As communication standards evolve to provide faster data transfer rates and higher throughput, the demands placed on antennas are becoming more challenging. For example, to meet requirements of fifth-generation (5G) mobile telecommunication at FR2 (Frequency Range 2) bands with MIMO (multi-input multi-output) of dual-polarization diversity, an antenna needs to support bandwidths that are broader than 19.5% and 26.3% respectively at two nonoverlapping bands starting from 24.25 to 29.5 GHz and from 37.0 to 48.2 GHz. It also needs to be able to transmit and receive independent signals of different polarizations (e.g., two signals carrying two different data streams by horizontal polarization and vertical polarization) with high signal isolation between these different polarizations, so as to provide high cross-polarization discrimination (XPD).

Moreover, antennas need to be compact in size, since modern electronic devices need to be slim, lightweight, and portable, and these devices have limited space available for an antenna. Accordingly, antennas need to have a high bandwidth-to-volume ratio representing bandwidth per unit volume (measured in, e.g., Hz/(mm$^3$)).

In the prior art, a stacked patch antenna can support two bands by stacking two patches, but this fails to satisfy the bandwidth requirements of 5G mobile telecommunication. The stacked patch antenna also suffers a relatively low bandwidth-to-volume ratio.

BRIEF SUMMARY OF THE INVENTION

An embodiment of the present invention provides an antenna. The antenna includes a first radiator positioned at a first level and connected to a ground plane at a second level. In a top view, the first radiator has a first edge, a second edge, a third edge, a fourth edge and a first arc edge. The second edge and the third edge are connected to opposite ends of the first edge. The fourth edge is connected to an end of the third edge opposite to the first edge. The first arc edge with a first radius has opposite ends respectively connected to the second edge and the fourth edge. The first arc edge has a first arc length corresponding to a first central angle, which is less than 90 degrees.

An embodiment of the present invention provides an antenna. The antenna includes separated radiators at a first level. The separated radiators are connected to the ground plane at a second level. In a top view, each of the radiators has a first edge, a second edge, a third edge, a fourth edge and an arc edge with a first radius. The second edge and the third edge are connected to opposite ends of the first edge. The fourth edge is connected to an end of the third edge opposite to the first edge. The first edge has a first length, which is less than or equal to 90% of the first radius. An angle between the first edge and the second edge is greater than or equal to 90 degrees and less than 180 degrees.

In addition, an embodiment of the present invention provides an antenna. The antenna includes separated radiators at a first level. The separated radiators are connected to a ground plane at a second level. In a top view, each of the radiators has a first edge, a second edge, a third edge, a fourth edge, an arc edge with a first radius and notches. The second edge and the third edge are connected to opposite ends of the first edge. The fourth edge is connected to an end of the third edge opposite to the first edge. The first edge has a first length less than or equal to 90% of the first radius, and wherein the first edge extends along a direction that does not intersect the arc edge. The notches are positioned at the second edge and the fourth edge.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

Figure 1A:
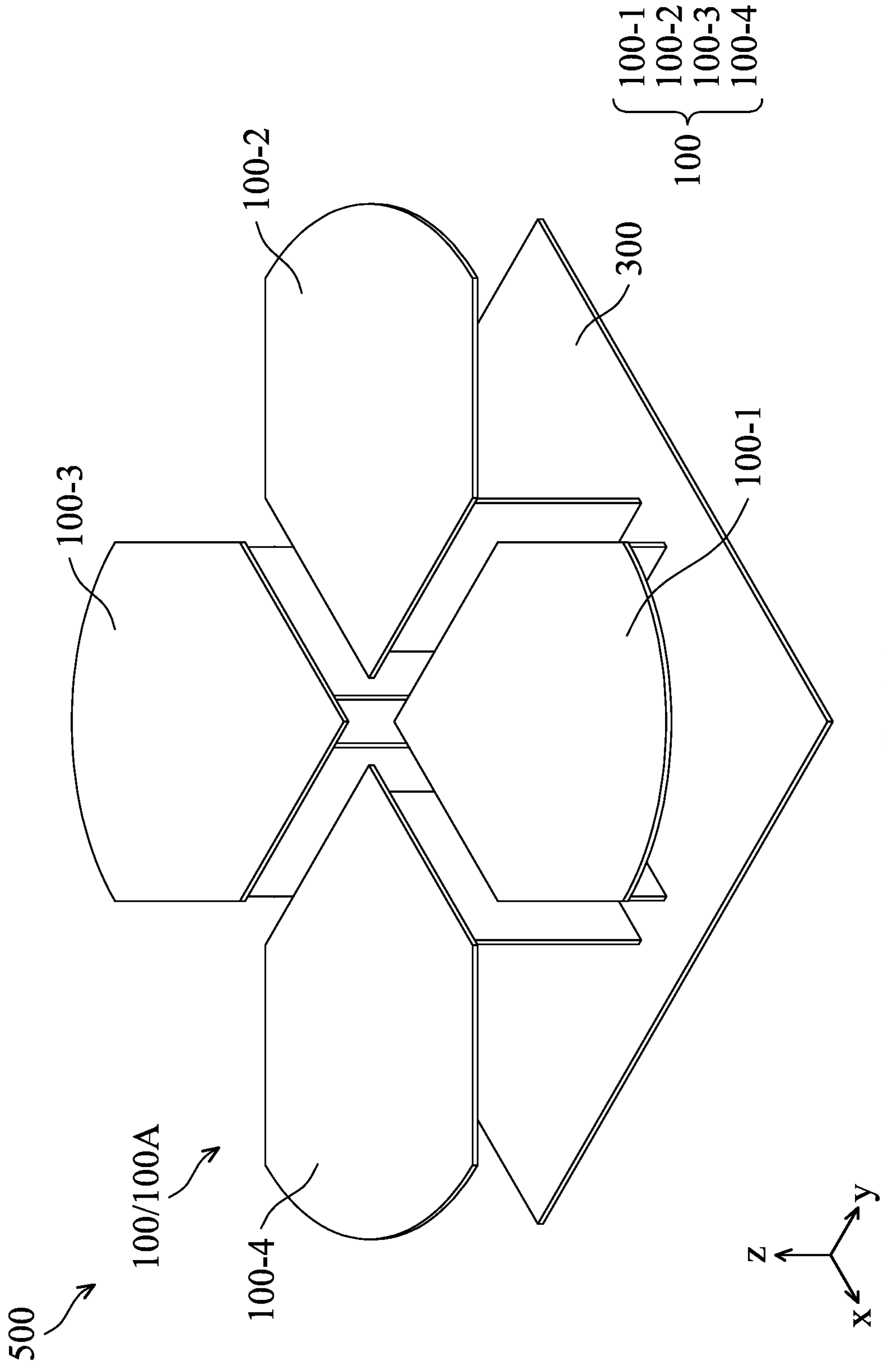
FIG. 1A is a perspective view of an antenna in accordance with some embodiments of the disclosure.

The following description is made for the purpose of illustrating the general principles of the invention and should not be taken in a limiting sense. The scope of the invention is best determined by reference to the appended claims.

The inventive concept is described fully hereinafter with reference to the accompanying drawings, in which exemplary embodiments of the inventive concept are shown. The advantages and features of the inventive concept and methods of achieving them will be apparent from the following exemplary embodiments that will be described in more detail with reference to the accompanying drawings. It should be noted, however, that the inventive concept is not limited to the following exemplary embodiments, and may be implemented in various forms. Accordingly, the exemplary embodiments are provided only to disclose the inventive concept and let those skilled in the art know the category of the inventive concept. Also, the drawings as illustrated are only schematic and are non-limiting. In the drawings, the size of some of the elements may be exaggerated for illustrative purposes and not drawn to scale. The dimensions and the relative dimensions do not correspond to actual dimensions in the practice of the invention Embodiments provide an antenna for multi-broadband (e.g., dual-broadband) and multi-polarization (e.g., dual-polarization) communication. The antenna may include a ground plane, separated radiators, conductive parasitic elements and feeding elements. The radiators may be configured to jointly function as one or more (e.g., two) dipoles, and each radiator may be configured to contribute to resonances at two or more nonoverlapping bands. In addition, each of the radiators has an arc edge and two outward-bending edges connected to opposite ends of the arc. In some embodiments, the arc edge with a specific radius has an arc length corresponding to a central angle of less than 90 degrees. The segment of the outward-bending edge close to the central angle of the arc edge has a length less than or equal to 90% of the radius of the arc edge. Therefore, a distance between the arc edges of the adjacent radiators can be increased to improve the bandwidth of the high band (HB). In some embodiments, the radiator has notches (slits) at the outward-bending edges for low band (LB) gain improvement. In some embodiments, the conductive parasitic elements may include middle segments and end segments, and the end segments may be arranged in another level different from the middle segments for impedance matching improvement. In some embodiments, the notches of the radiators may be arranged partially overlapping the corresponding conductive parasitic elements for impedance control.

Figure 1B:
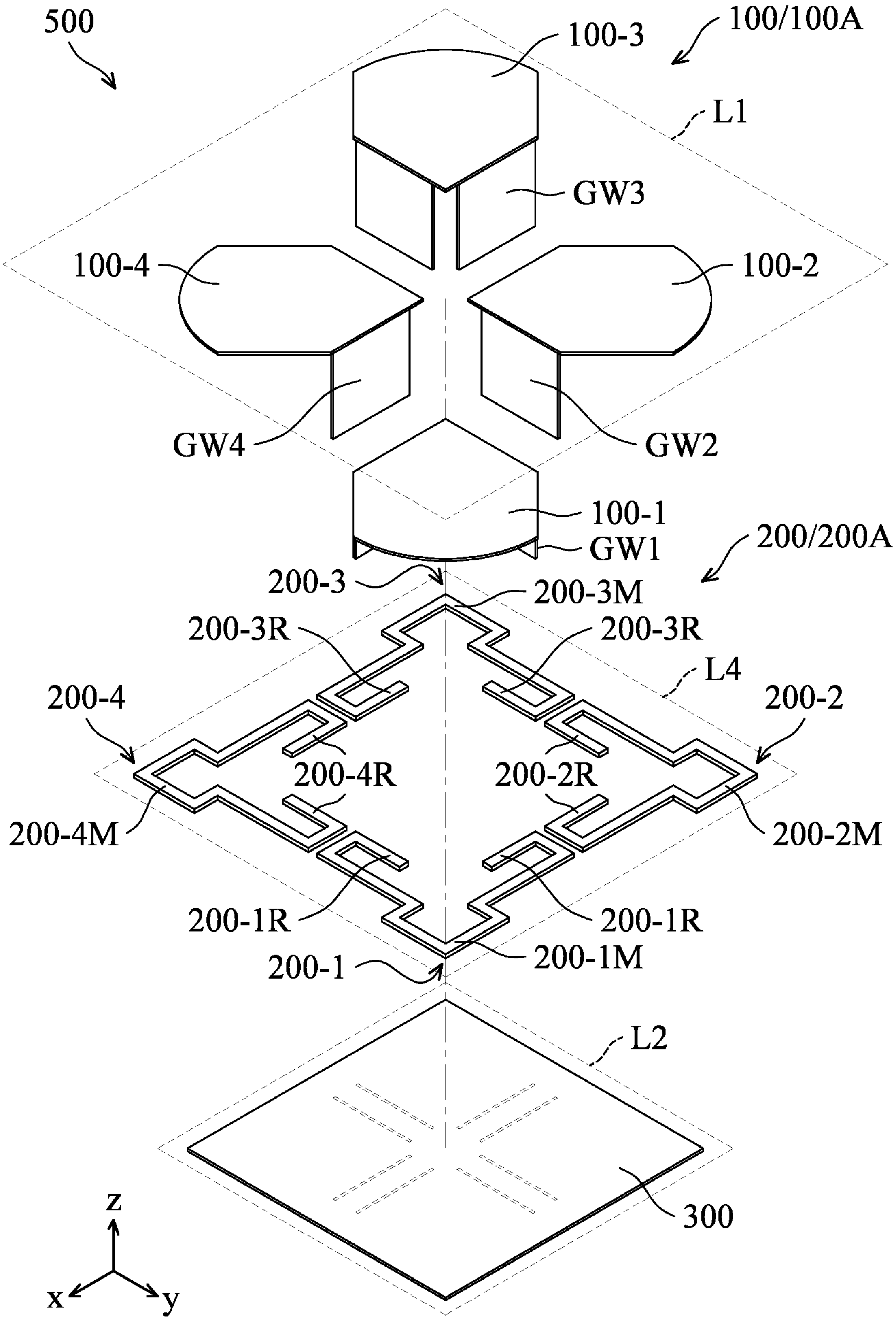
FIG. 1B an exploded view of the antenna shown in FIG. 1A in accordance with some embodiments of the disclosure, showing radiators, conductive parasitic elements and a ground plane of the antenna.
Figure 1C:
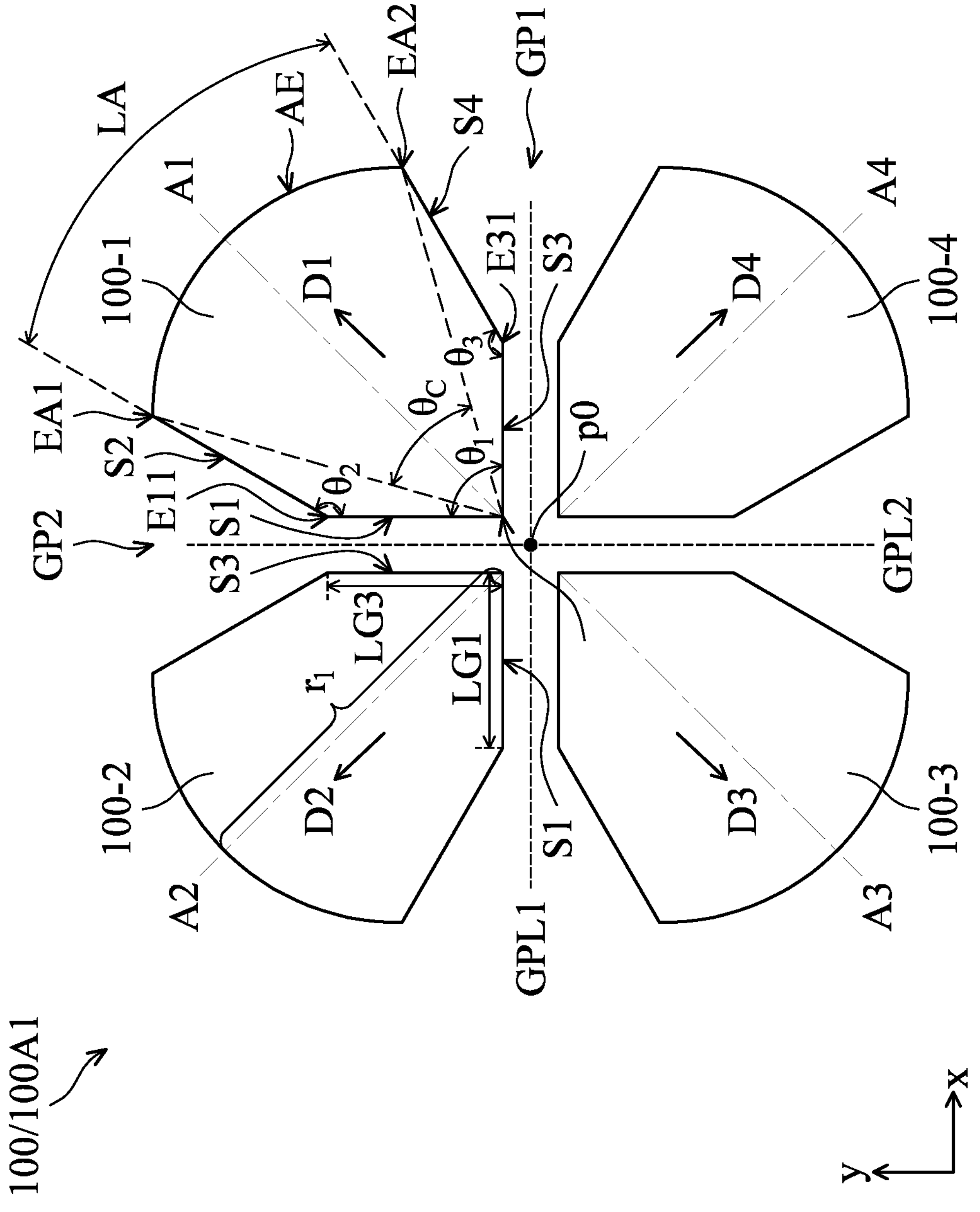
FIG. 1C is a top view of the antenna shown in FIG. 1A in accordance with some embodiments of the disclosure, showing the arrangement of the radiators.

FIG. 1A is a perspective view of an antenna 500 in accordance with some embodiments of the disclosure. FIG. 1B an exploded view of the antenna 500 shown in FIG. 1A in accordance with some embodiments of the disclosure. FIG. 1C is a top view of the antenna 500 shown in FIG. 1A in accordance with some embodiments of the disclosure, showing the arrangement of the radiators 100. For illustration, FIG. 1A shows radiators 100 and a ground plane 300 of the antenna 500, and FIG. 1C only shows the radiators 100 of the antenna 500, the remaining features may be shown in FIG. 1B. As shown in FIGS. 1A, 1B and 1C, the antenna 500 includes the radiators 100, conductive parasitic elements 200 and the ground plane 300.

In some embodiments, the radiators 100 include radiators 100-1, 100-2, 100-3 and 100-4 separated from each other. In addition, the radiators 100 may jointly function as a plurality of dipoles. Each of the radiators 100-1, 100-2, 100-3, 100-4 may be a planar conductor positioned at a first level L1 extending parallel to xy-plane. In addition, each of the radiators 100-1, 100-2, 100-3, 100-4 may be connected (or electrically connected) to a conductive ground plane 300 which may be a planar conductor positioned at a second level L2 extending parallel to xy-plane. In addition, the first level L1 is different form the second level L2. It is note that the ground plane 300 shown in FIGS. 1A and 1B is just to demonstrate how the antenna 500 is disposed on the ground plane 300, not to limit the ground plane 300 to the depicted size and shape. The ground plane 300 parallel to xy-plane may in fact extend wider beyond the size shown in FIGS. 1A and 1B.

As shown in FIG. 1B, the antenna 500 may further include conductive ground walls GW1, GW2, GW3 and GW4 connecting to the radiators 100-1, 100-2, 100-3 and 100-4 and the ground plane 300. The ground walls GW1, GW2, GW3 and GW4 corresponding to the radiators 100-1, 100-2, 100-3 and 100-4 may extend downward along negative z-direction from bottom surfaces of the radiators 100-1, 100-2, 100-3 and 100-4 to connect the ground plane 300.

As shown in FIG. 1C, on xy-plane, projections of the radiators 100-1 to 100-4 may surround a geometric origin p0 and may face toward four different directions D1, D2, D3 and D4. For example, the directions D1, D2, D3 and D4 may respectively be 45, 135, 225 and 315 degrees rotated from x-direction. The radiators 100-1 to 100-4 may be separated by gaps GP1 and GP2 respectively extending along geometric lines GPL1 and GPL2. For example, the radiators 100-1 and 100-2 may be arranged at two opposite sides of the gap GP2, the radiators 100-2 and 100-3 may be arranged at two opposite sides of the gap GP1, etc. Geometry (shapes, structure and sizes) of the radiators 100-1 to 100-4 may substantially be the same, or may have differences (e.g., for feeding, routing and/or mechanical design consideration, etc.) and/or variations (e.g., due to limited precision and accuracy of manufacture, etc.).

As shown in FIG. 1C, each of the radiators 100-1, 100-2, 100-3 and 100-4 may be formed from the sector-shaped radiator having the radius of $r_1$ and the central angle of 90 degrees by removing the two corners where the arc edge and the two radii meet. Therefore, the arc length of the arc edge can be reduced to increase a distance between the arc edges of the adjacent radiators can be increased to improve the bandwidth of the high band (HB). In some embodiments, each of the radiators 100-1, 100-2, 100-3 and 100-4 has a first edge S1, a second edge S2, a third edge S3, a fourth edge S4 and an arc edge AE in a top view as shown in FIG. 1C. The second edge S2 and the third edge S3 are connected to opposite ends E11 and E12 of the first edge S1. In addition, the fourth edge S4 is connected to an end E31 of the third edge S3 opposite to the first edge S1. In some embodiments, the first edge S1 and the third edge S3 comprise linear edges. In addition, the first edge S1 and the third edge S3 may extend along geometric lines GPL2 and GPL1. As shown in FIG. 1C, an angle $\theta_1$ between the first edge S1 and the third edge S3 may be equal to 90 degrees. An angle $\theta_2$ between the first edge S1 and the second edge S2 may be greater than or equal to 90 degrees and less than 180 degrees. Similarly, an angle $\theta_3$ between the third edge S3 and the fourth edge S4 may be greater than or equal to 90 degrees and less than 180 degrees. Furthermore, the end E12 of the first edge S1 may overlap the center of arc edge AE.

In some embodiments, the arc edge AE with a radius $r_1$ has opposite ends EA1 and EA2 respectively connected to the second edge S2 and the fourth edge S4. In some embodiments, the arc edge AE has an arc length LA corresponding to a central angle $\theta_C$ that is less than 90 degrees. Therefore, in some embodiments, the first edge S1 has a length LG1 less than or equal to 90% of the radius $r_1$ of the arc edge AE. Similarly, the third edge S3 has a length LG3 less than or equal to 90% of the radius $r_1$ of the arc edge AE. In addition, the first edge S1 and the third edge S3 may respectively extend along directions that does not intersect the arc edge AE.

In some embodiments, one or more of the radiators 100-1, 100-2, 100-3 and 100-4 may have symmetrical shapes. For example, in the radiator 100-1, the first edge S1 and the third edge S3 may be symmetrical along an axis A1 that is parallel to a radial direction of the radius $r_1$ and intersects the middle point of the arc edge AE. Therefore, the axis A1 may serve as the axis of symmetry A1 of the radiator 100-1. In addition, the second edge S2 and the fourth edge S4 of the radiator 100-1 may be symmetrical along the axis of symmetry A1. In some embodiments, one or more of the radiators 100-1, 100-2, 100-3 and 100-4 may have asymmetrical shapes. For example, the first edge S1 and the third edge S3 of the radiator 100-1 may be asymmetrical along the axis A1 that is parallel to the radial direction of the radius $r_1$ and intersects the middle point of the arc edge AE. For example, the second edge S2 and the fourth edge S4 of the radiator 100-1 may be asymmetrical along the axis A1.

In some embodiments, the adjacent radiators are symmetrical along the geometric line GPL1 of the separation gap GP1 or the geometric line GPL2 of the separation gap GP2. For example, the radiators 100-1 and 100-2 separated by the gap GP2 may be symmetrical along the geometric line GPL2. The radiators 100-2 and 100-3 separated by the gap GP1 may be symmetrical along the geometric line GPL1. The radiators 100-3 and 100-4 separated by the gap GP2 may be symmetrical along the geometric line GPL2. The radiators 100-4 and 100-1 separated by the gap GP1 may be symmetrical along the geometric line GPL1. Therefore, the radiators 100-2, 100-3 and 100-4 may have axes of symmetry A2, A3 and A4. Angles between the axes of symmetry A2, A3 and A4 and the axis of symmetry A1 may respectively be 90, 180 and 270 degrees. In some other embodiments, the adjacent radiators may be asymmetrical along the geometric line GPL1 of the separation gap GP1 or the geometric line GPL2 of the separation gap GP2.

Figure 2A:
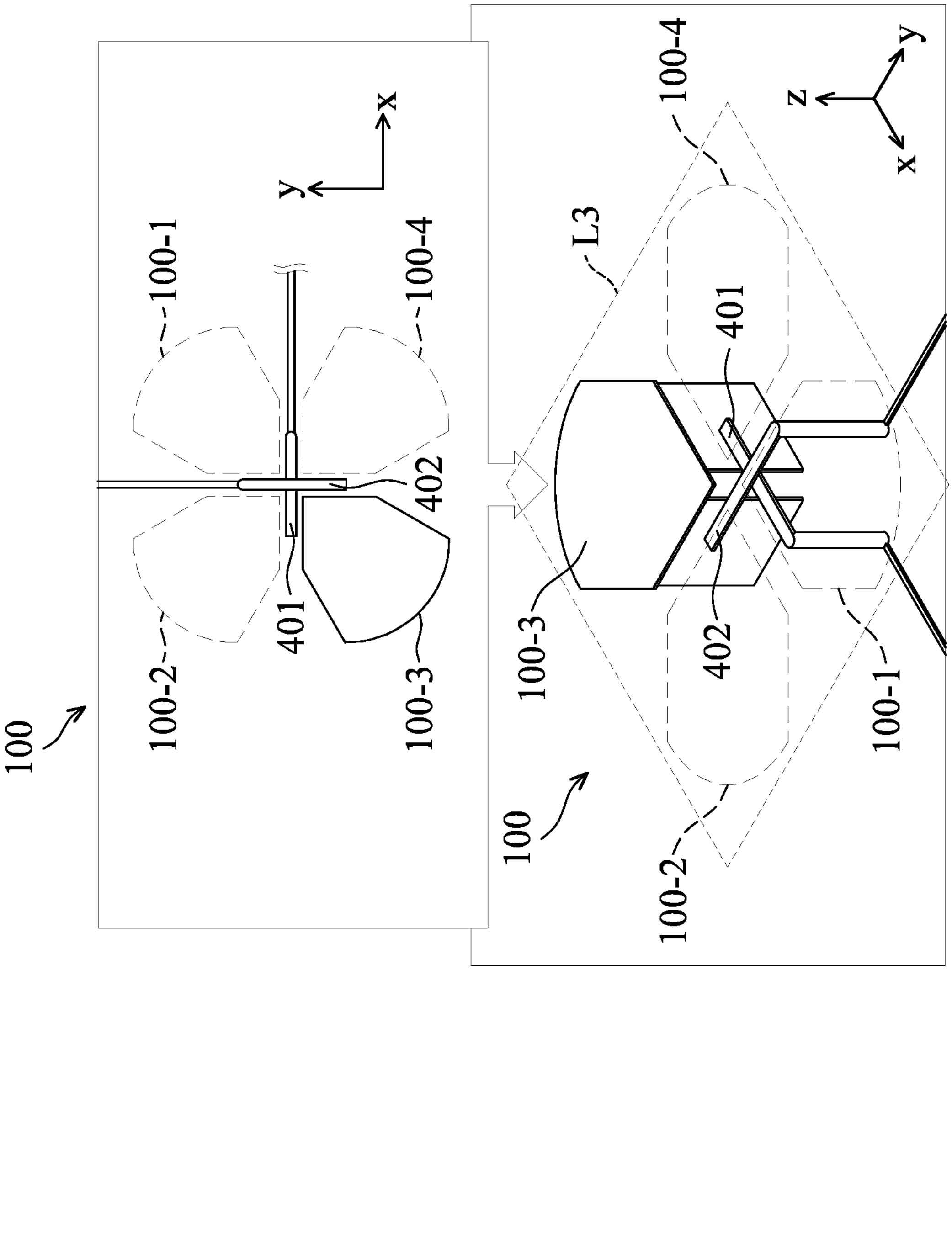
FIGS. 2A and 2B are perspective views showing feeding elements of the antenna in accordance with some embodiments of the disclosure.

In some embodiments, the antenna 500 may further include feeding elements. FIG. 2A is a perspective view showing feeding elements 401 and 402 of the antenna 500 in accordance with some embodiments of the disclosure. FIG. 2A also shows a feeding arrangement of the antenna 500 by a high angle 3D view and a top view of the radiators 100 (with the radiators 100-1, 100-2 and 100-4 hidden except the radiator 100-3). As shown in FIG. 2A, each of the feeding elements 401 and 402 may be separated and insulated from the ground plane 300, the conductive parasitic elements 200-1 to 200-4 and the radiators 100-1 to 100-4. The feeding elements 401 and 402 may also be separated and insulated from each other. In addition, the feeding elements 401 and 402 may be positioned at a third level L3. In some embodiments, the third level L3 is positioned between the first level L1 (where the radiators are disposed) and the second level L2 (where the ground plane is disposed) along z-direction. In some embodiments, the level L3 may be aligned with one of the first level L1 and the second level L2 (i.e. the feeding elements 401 and 402 may be positioned at the first level L1 or the second level L2) along z-direction. As shown in FIG. 2A, in some embodiments, the feeding element 401 may extend across the gap GP2 along the gap GP1. The feeding element 402 may extend across the gap GP1 along the gap GP2. In addition, the feeding elements 401 and 402 may be connected to vias and outbound traces. By the feeding element 401 shown in FIG. 2A, the radiators 100-1 and 100-4 may jointly function as one pole of a first dipole for a polarization along x-direction, while the radiators 100-2 and 100-3 may jointly function as an opposite pole of the first dipole. By the feeding element 402 shown in FIG. 2A, the radiators 100-1 and 100-2 may jointly function as one pole of a second dipole for a polarization along y-direction, while the radiators 100-3 and 100-4 may jointly function as an opposite pole of the second dipole.

Figure 2B:
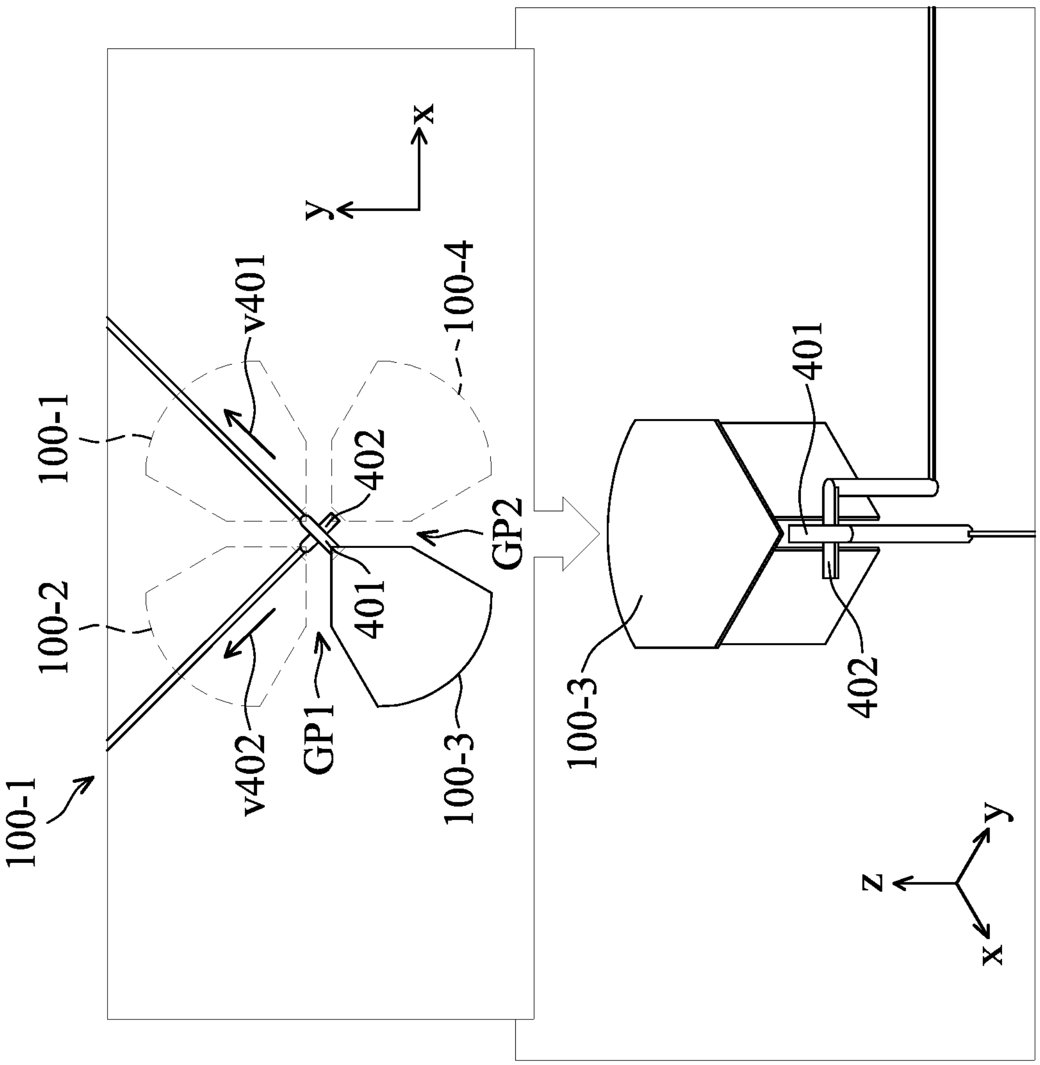

FIG. 2B is a perspective view showing feeding elements 401 and 402 of the antenna 500 in accordance with some embodiments of the disclosure. In some embodiments, the feeding elements 401 and 402 may be fitted in an intersection of the gaps GP1 and GP2. The feeding element 401 may extend parallel to a direction v401. The feeding element 402 may extend parallel to a direction v402. In addition, the feeding elements 401 and 402 may be connected to vias and outbound traces (not shown). For example, in an embodiment, the direction v401 may substantially be 45 degrees rotated from x-direction, and the direction v402 may substantially be 45 degrees rotated from y-direction. By the feeding element 401 shown in FIG. 2B, the radiators 100-1 and 100-3 may respectively function as two opposite poles of a first dipole for a polarization along the direction v401, and the radiators 100-2 and 100-4 may respectively function as two opposite poles of a second dipole for the polarization along the direction v401. By the feeding element 402 shown in FIG. 2B, the radiators 100-2 and 100-4 may respectively function as two opposite poles of a third dipole for a polarization along the direction v402, and the radiators 100-1 and 100-3 may respectively function as two opposite poles of a fourth dipole for the polarization along the direction v402.

Figures 3A, 3B, 3C, 3D:
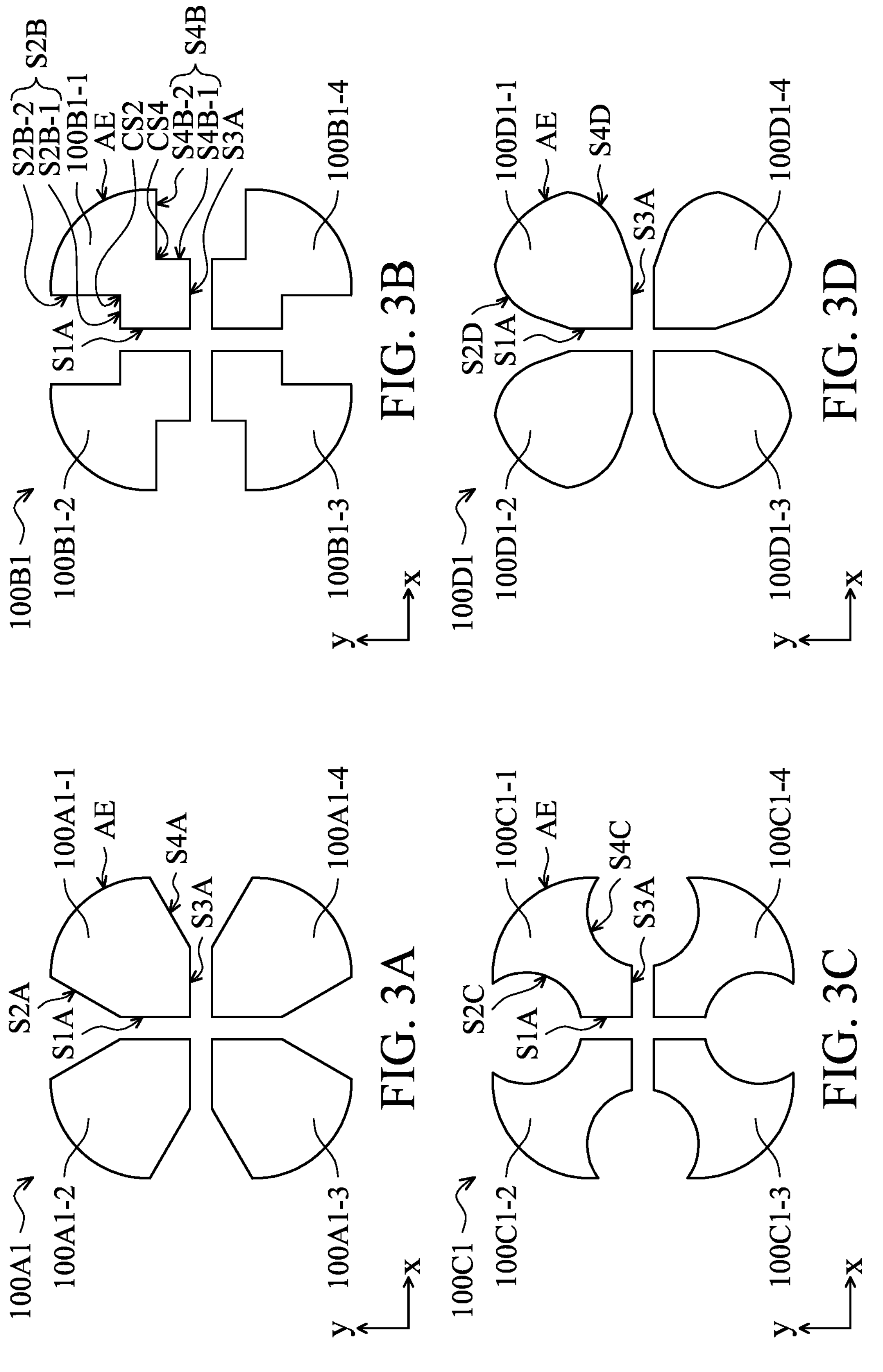
FIGS. 3A-3D are top views of radiators of an antenna in accordance with some embodiments of the disclosure.
Figure 4A:
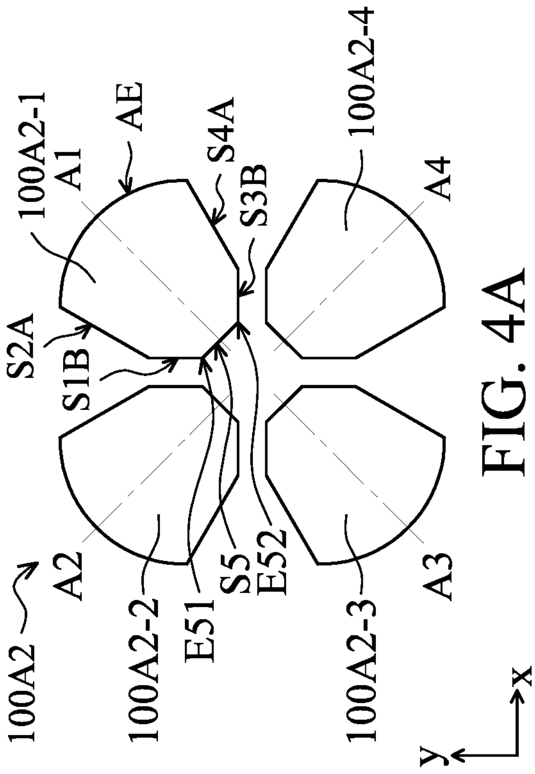
FIGS. 4A-4D are top views of radiators of an antenna in accordance with some embodiments of the disclosure.
Figure 4B:
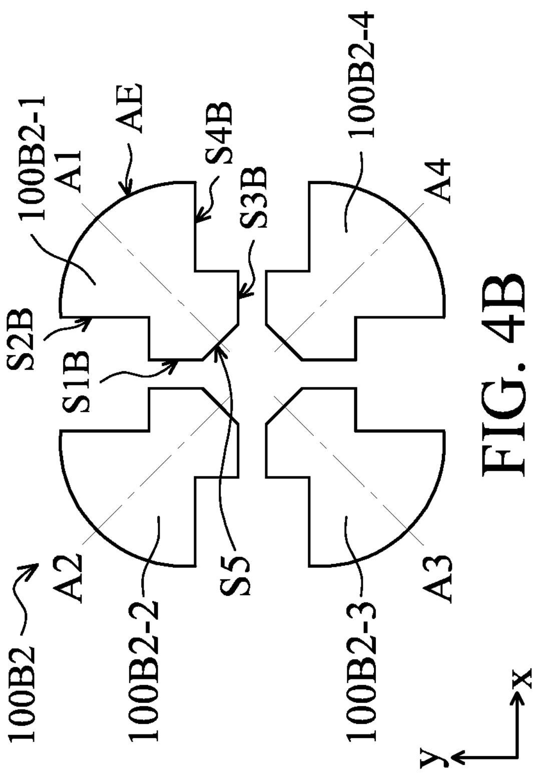
Figure 4C:
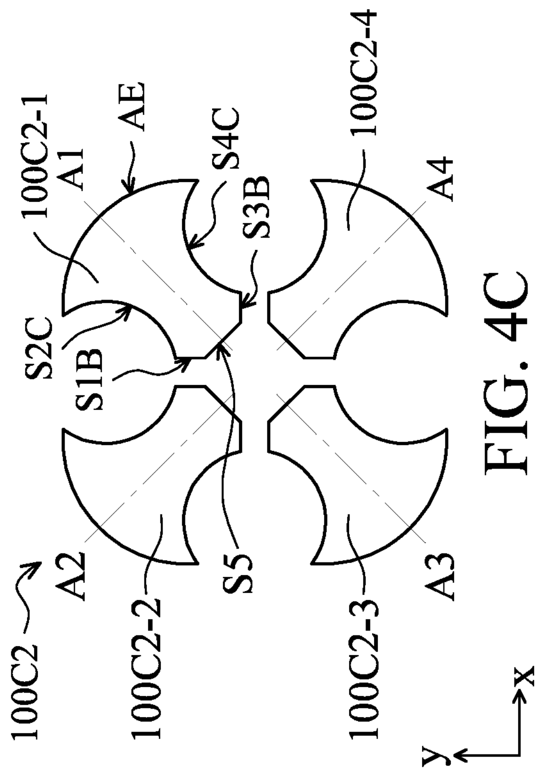
Figure 4D:
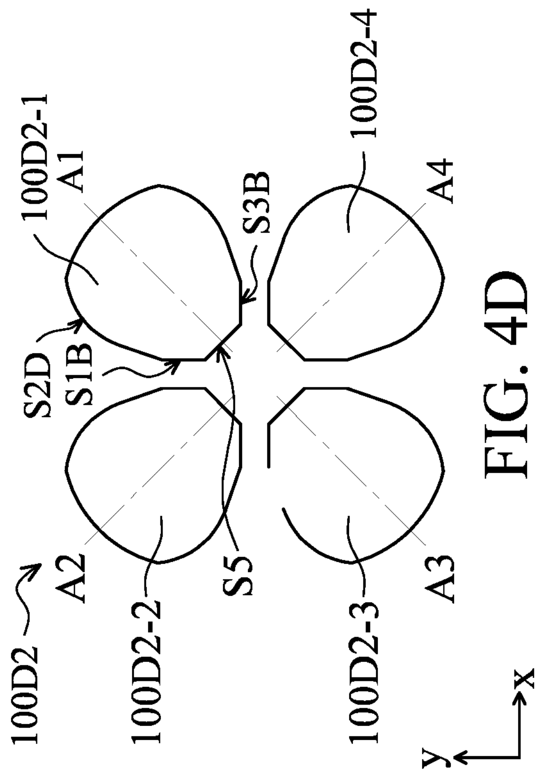
Figure 5A:
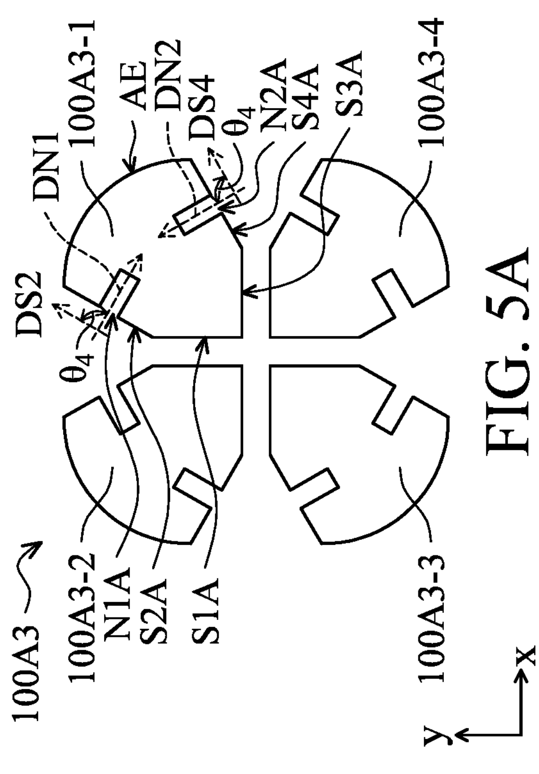
FIGS. 5A-5D are top views of radiators of an antenna in accordance with some embodiments of the disclosure.
Figure 5B:
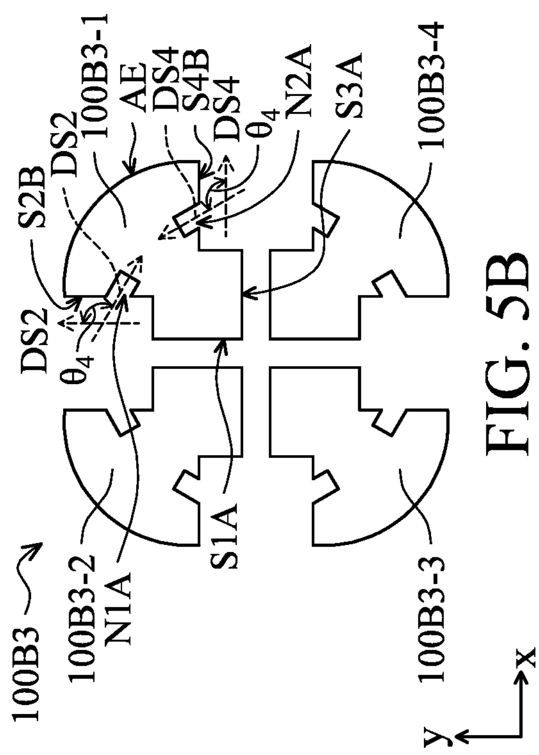
Figure 5C:
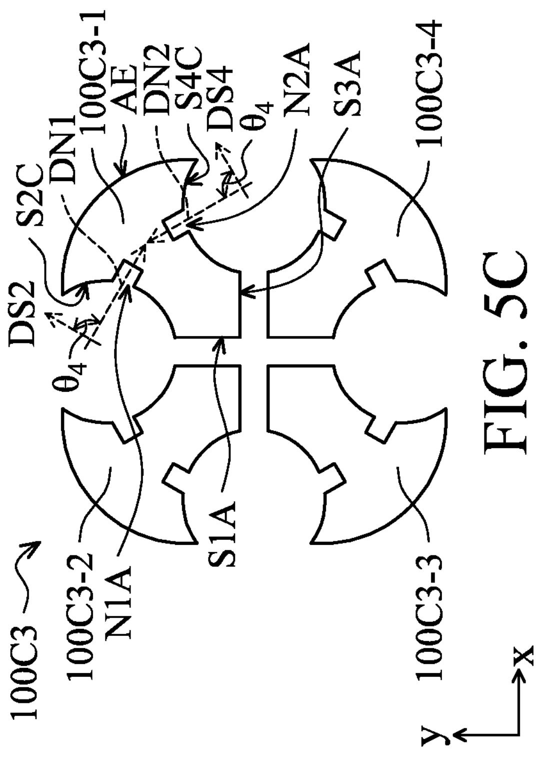
Figure 5D:
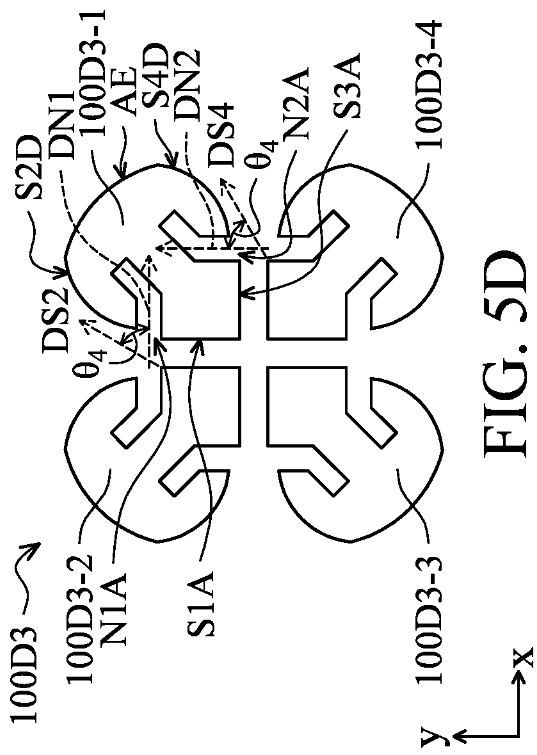
Figures 6A, 6B, 6C, 6D:
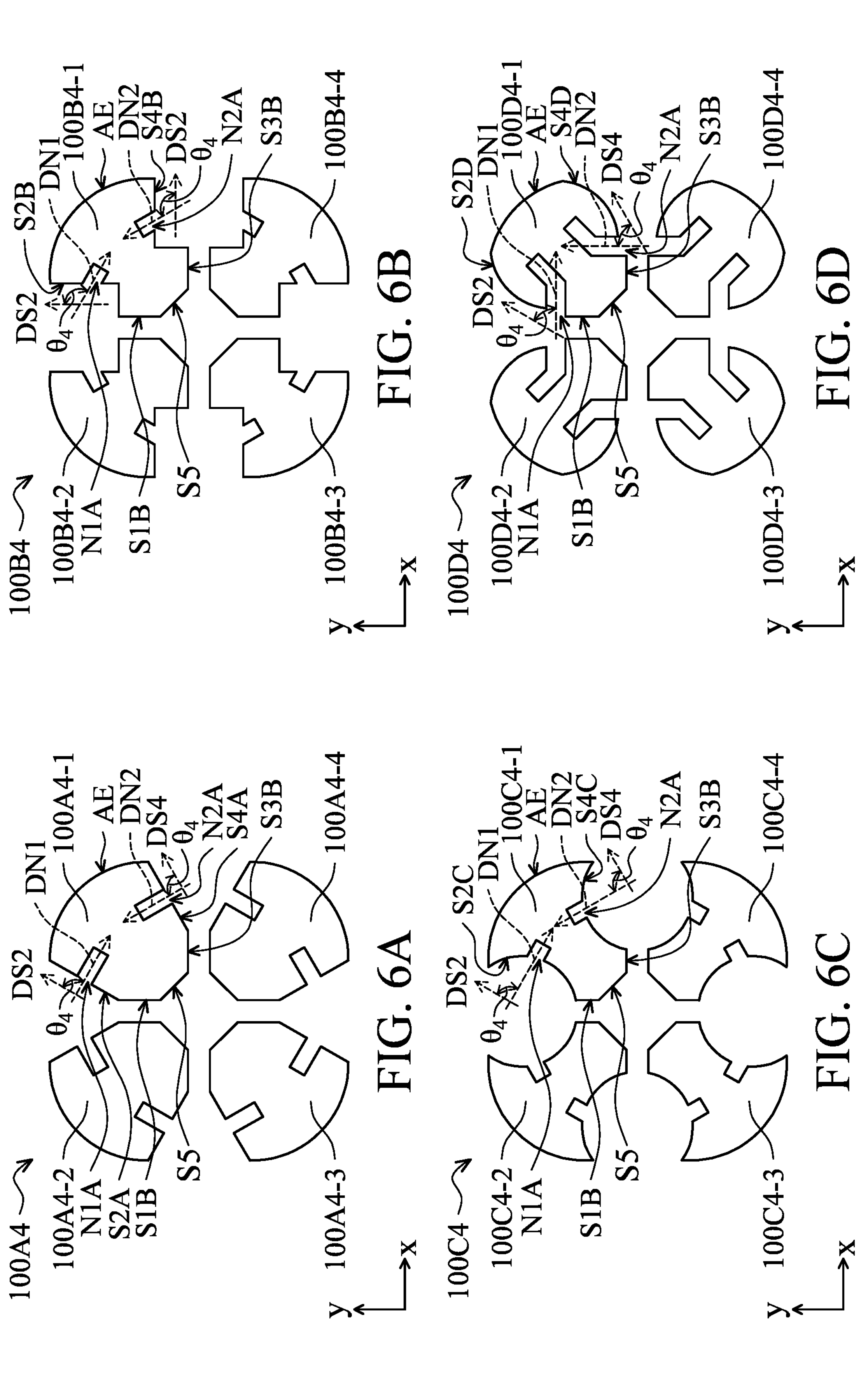
FIGS. 6A-6D are top views of radiators of an antenna in accordance with some embodiments of the disclosure.
Figure 7A:
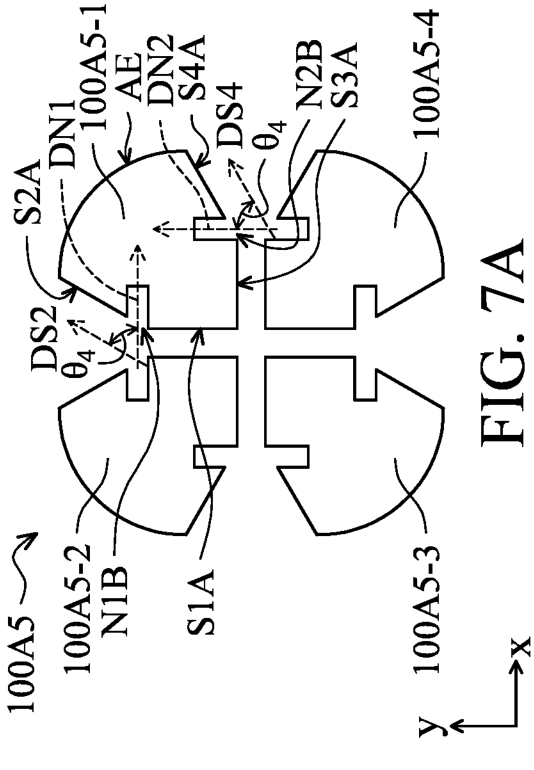
FIGS. 7A-7D are top views of radiators of an antenna in accordance with some embodiments of the disclosure.
Figure 7B:
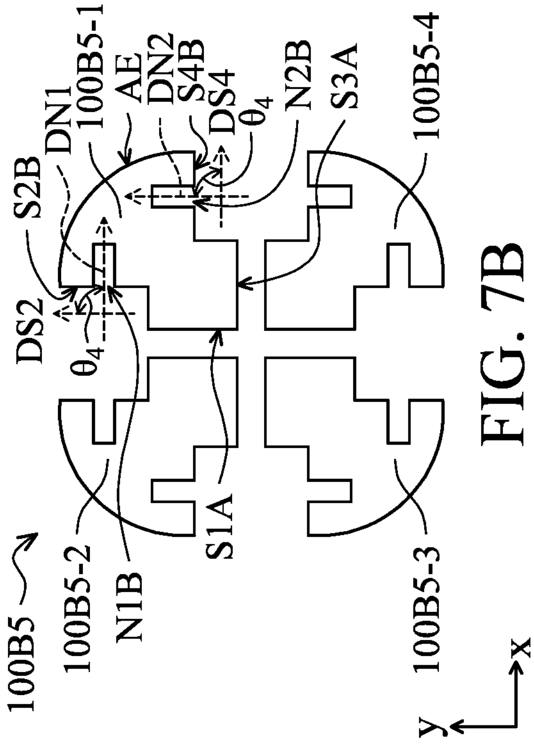
Figure 7C:
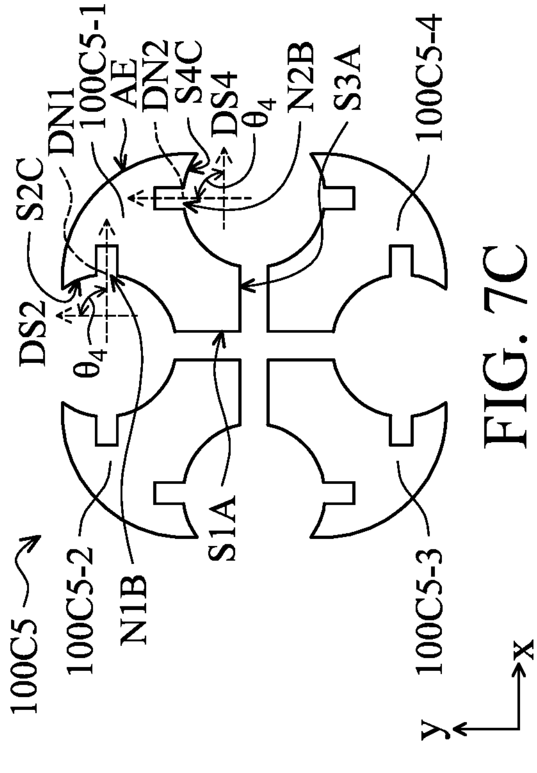
Figure 7D:
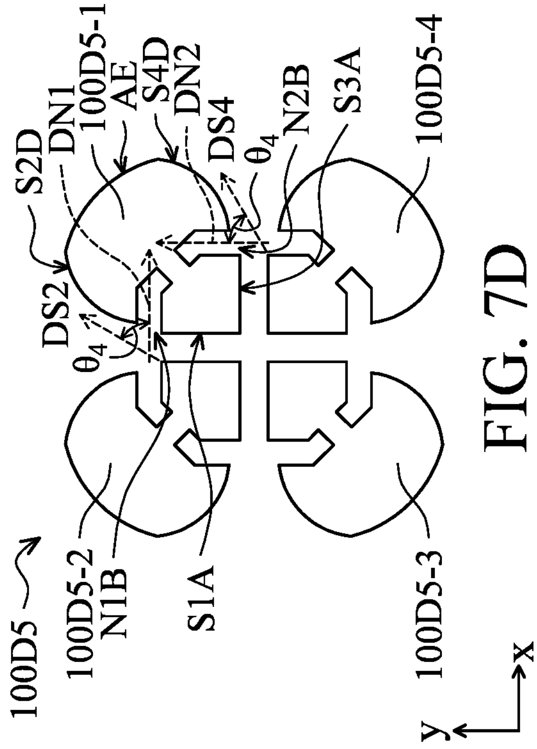
Figure 8A:
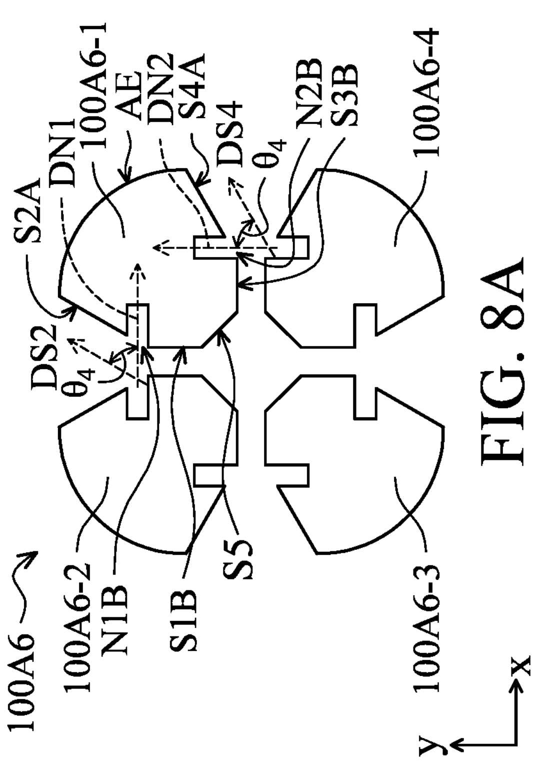
FIGS. 8A-8D are top views of radiators of an antenna in accordance with some embodiments of the disclosure.
Figure 8B:
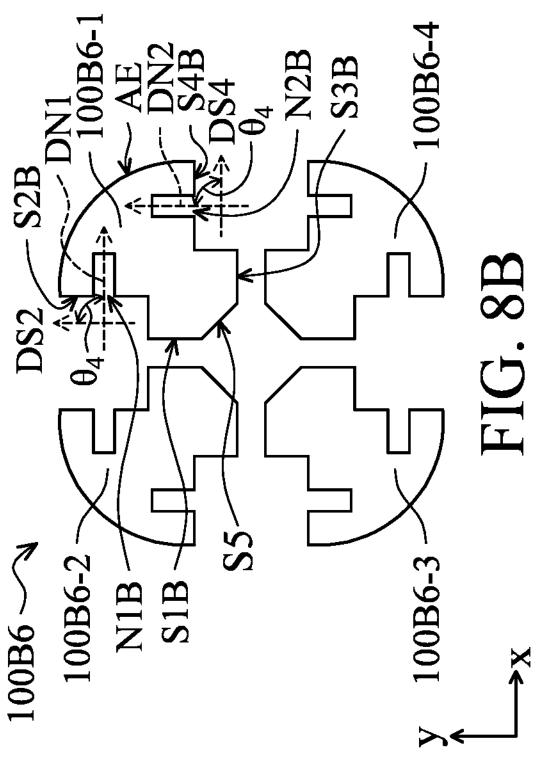
Figure 8C:
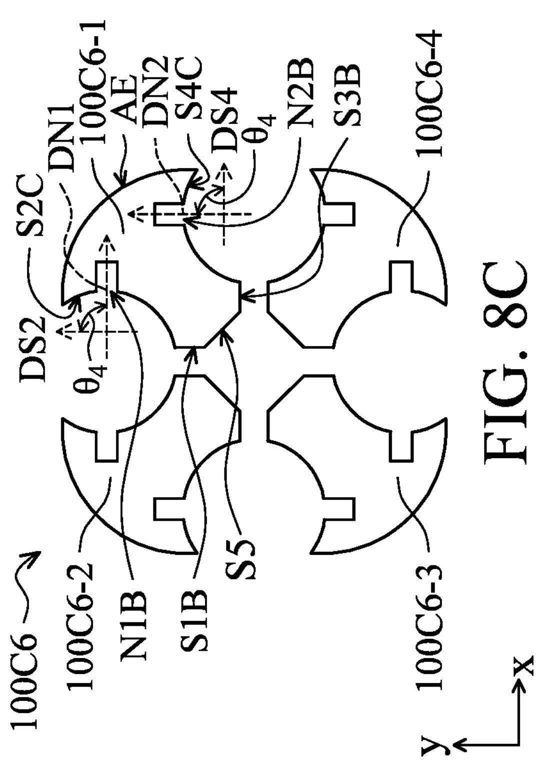
Figure 8D:
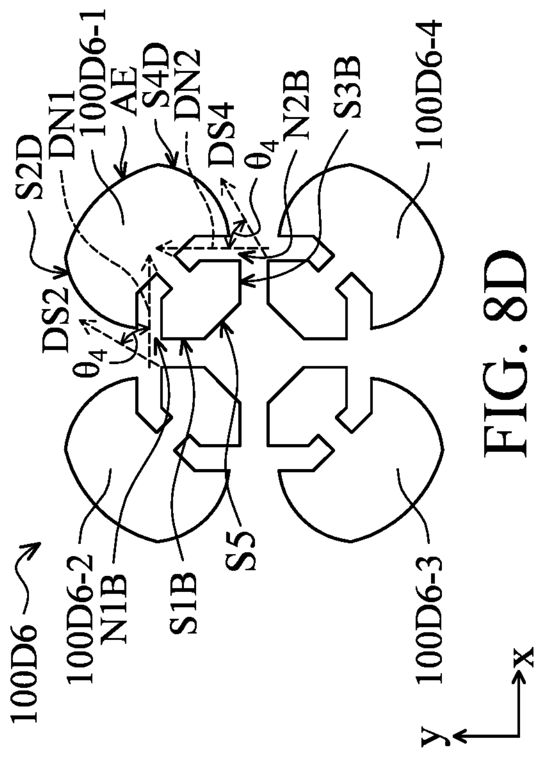

FIGS. 1C and 3A also illustrate top views of the radiators 100A1 (including radiators 100A1-1, 100A1-2, 100A1-3 and 100A1-4) of the antenna 500 in accordance with some embodiments of the disclosure. In some embodiments, a first edge S1A, a second edge S2A, a third edge S3A and a fourth edge S4A of the radiators 100A1 are linear edges.

FIG. 3B is a top view of radiators 100B1 of the antenna 500 in accordance with some embodiments of the disclosure. Elements of the embodiments hereinafter, that are the same or similar as those previously described with reference to FIGS. 1A-1C and 3A are not repeated for brevity. As shown in FIG. 3B, the difference between the radiators 100A1 and the radiators 100B1 is that a second edge S2B and a fourth edge S4B of each of the radiators 100B1 (including radiators 100B1-1, 100B1-2, 100B1-3 and 100B1-4) are bending edges (e.g., V-bending edges). For example, the second edge S2B having a concave corner CS2 may include edge portions S2B-1 and S2B-2 connected with each other. Similarly, the fourth edge S4B having a concave corner CS4 may include edge portions S4B-1 and S4B-2 connected with each other.

FIG. 3C is a top view of radiators 100C1 of the antenna 500 in accordance with some embodiments of the disclosure. Elements of the embodiments hereinafter, that are the same or similar as those previously described with reference to FIGS. 1A-1C and 3A-3B are not repeated for brevity. As shown in FIG. 3C, the difference between the radiators 100A1 and the radiators 100C1 is that a second edge S2C and a fourth edge S4C of each of the radiators 100C1 (including radiators 100C1-1, 100C1-2, 100C1-3 and 100C1-4) comprise curved edges such as concave curved edges.

FIG. 3D is a top view of radiators 100D1 of the antenna 500 in accordance with some embodiments of the disclosure. Elements of the embodiments hereinafter, that are the same or similar as those previously described with reference to FIGS. 1A-1C and 3A-3C are not repeated for brevity. As shown in FIG. 3D, the difference between the radiators 100A1 and the radiators 100D1 is that a second edge S2D and a fourth edge S4D of each of the radiators 100D1 (including radiators 100D1-1, 100D1-2, 100D1-3 and 100D1-4) comprise curved edges such as convex curved edges.

In some embodiments, the overlapping area between the radiator and the feeding element can be adjusted to change the coupling capacitance for impedance matching. FIGS. 4A, 4B, 4C and 4D are top views of the radiators 100A2, 100B2, 100C2 and 100D2 of the antenna 500 in accordance with some embodiments of the disclosure. Elements of the embodiments hereinafter, that are the same or similar as those previously described with reference to FIGS. 1A-1C and 3A-3D are not repeated for brevity. As shown in FIGS. 4A-4D, the difference between the radiators 100A1, 100B1, 100C1 and 100D1 and the radiators 100A2 (including radiators 100A2-1, 100A2-2, 100A2-3 and 100A2-4), the radiators 100B2 (including radiators 100B2-1, 100B2-2, 100B2-3 and 100B2-4), the radiators 100C2 (including radiators 100C2-1, 100C2-2, 100C2-3 and 100C2-4) and the radiators 100D2 (including radiators 100D2-1, 100D2-2, 100D2-3 and 100D2-4) is that each of the radiators 100A2, 100B2, 100C2 and 100D2 includes a fifth edge S5 having opposite ends E51 and E52 respectively connected to a first edge S1B and a third edge S3B. In some embodiments, the axis of symmetry A1, A2, A3 or A4 intersects the middle point of the fifth edge S5. In other words, the radiators 100A2, 100B2, 100C2 and 100D2 are formed by removing portions of the radiators 100A1, 100B1, 100C1 and 100D1 at the corners where the first edges S1B and the third edges S3B meet. Compared with the antenna 500 including the radiators 100A1, 100B1, 100C1 or 100D1 (shown in FIG.

3A, 3B, 3C or 3D) and the feeding elements 401 and 402 extending below the radiators 100A1, 100B1, 100C1 and 100D1 from the fifth edges S5 shown in FIG. 2B (for example, the feeding element 401 may extend along the axes of symmetry A1 and A3, and the feeding element 402 may extend along the axes of symmetry A2 and A4), the antenna 500 including the radiators 100A2, 100B2, 100C2 or 100D2 (shown in FIG. 4A, 4B, 4C or 4D) and the feeding elements 401 and 402 intersecting the radiators (shown in FIG. 2B) may have reduced coupling capacitances. Therefore, the impedance matching of the antenna 500 can be improved.

In some embodiments, the radiator may have one or more notches at the second edge S2A/S2B/S2C/S2D and/or the fourth edge S4A/S4B/S4C/S4D for low-band gain improvement. FIGS. 5A, 5B, 5C and 5D are top views of the radiators 100A3, 100B3, 100C3 and 100D3 of the antenna 500 in accordance with some embodiments of the disclosure. Elements of the embodiments hereinafter, that are the same or similar as those previously described with reference to FIGS. 1A-1C, 3A-3D and 4A-4D are not repeated for brevity. As shown in FIGS. 5A-5D, the difference between the radiators 100A1, 100B1, 100C1 and 100D1 and the radiators 100A3 (including radiators 100A3-1, 100A3-2, 100A3-3 and 100A3-4), the radiators 100B3 (including radiators 100B3-1, 100B3-2, 100B3-3 and 100B3-4), the radiators 100C3 (including radiators 100C3-1, 100C3-2, 100C3-3 and 100C3-4) and the radiators 100D3 (including radiators 100D3-1, 100D3-2, 100D3-3 and 100D3-4) is that the radiators 100A3, 100B3, 100C3 and 100D3 include notches N1A at the second edges S2A, S2B, S2C and S2D and notches N2A at the fourth edges S4A, S4B, S4C and S4D. The notch N1A may have an extending direction DN1, and the notch N2A may have an extending direction DN2. In some embodiments, an angle $\theta_4$ between an extending direction DS2 of the second edge S2A/S2B (or an extending direction DS2 of the tangent line to the arc edge S2C/S2D) and the extending direction DN1 of the notch N1A (or an extending direction DS4 of the fourth edge S4A/S4B (or an extending direction DS4 of the tangent line to the arc edge S4C/S4D) and the extending direction DN2 of the notch N2A) is greater than 0 degree and less than 180 degrees.

FIGS. 6A, 6B, 6C and 6D are top views of the radiators 100A4, 100B4, 100C4 and 100D4 of the antenna 500 in accordance with some embodiments of the disclosure. Elements of the embodiments hereinafter, that are the same or similar as those previously described with reference to FIGS. 1A-1C, 3A-3D, 4A-4D, 5A-5D and 6A-6D are not repeated for brevity. As shown in FIGS. 6A-6D, the difference between the radiators 100A1, 100B1, 100C1 and 100D1 and the radiators 100A4 (including radiators 100A4-1, 100A4-2, 100A4-3 and 100A4-4), the radiators 100B4 (including radiators 100B4-1, 100B4-3, 100B4-3 and 100B4-4), the radiators 100C4 (including radiators 100C4-1, 100C4-3, 100C4-3 and 100C4-4) and the radiators 100D4 (including radiators 100D4-1, 100D4-3, 100D4-3 and 100D4-4) is that the radiators 100A4, 100B4, 100C4 and 100D4 include the notches N1A at the second edges S2A, S2B, S2C and S2D and the notches N2A at the fourth edges S4A, S4B, S4C and S4D. In some embodiments as shown in FIGS. 6A, 6B, 6C and 6D, the angle $\theta_4$ is greater than 0 degree and less than 180 degrees.

FIGS. 7A, 7B, 7C and 7D are top views of the radiators 100A5, 100B5, 10005 and 100D5 of the antenna 500 in accordance with some embodiments of the disclosure. Elements of the embodiments hereinafter, that are the same or similar as those previously described with reference to FIGS. 1A-1C, 3A-3D, 4A-4D, 5A-5D and 6A-6D are not repeated for brevity. As shown in FIGS. 7A-7D, the difference between the radiators 100A3, 100B3, 100C3 and 100D3 and the radiators 100A5 (including radiators 100A5-1, 100A5-2, 100A5-3 and 100A5-4), the radiators 100B5 (including radiators 100B5-1, 100B5-2, 100B5-3 and 100B5-4), the radiators 10005 (including radiators 10005-1, 10005-2, 10005-3 and 10005-4) and the radiators 100D5 (including radiators 100D5-1, 100D5-2, 100D5-3 and 100D5-4) is that the radiators 100A5, 100B5, 10005 and 100D5 include notches N1B at the second edges S2A, S2B, S2C and S2D and notches N2B at the fourth edges S4A, S4B, S4C and S4D. In addition, the angles $\theta_4$ of the radiators 100A5, 100B5, 10005 and 100D5 is different from the angles $\theta_4$ of the radiators 100A3, 100B3, 100C3 and 100D3.

FIGS. 8A, 8B, 8C and 8D are top views of the radiators 100A6, 100B6, 10006 and 100D6 of the antenna 500 in accordance with some embodiments of the disclosure. Elements of the embodiments hereinafter, that are the same or similar as those previously described with reference to FIGS. 1A-1C, 3A-3D, 4A-4D, 5A-5D, 6A-6D and 7A-7D are not repeated for brevity. As shown in FIGS. 8A-8D, the difference between the radiators 100A4, 100B4, 100C4 and 100D4 and the radiators 100A6 (including radiators 100A6-1, 100A6-2, 100A6-3 and 100A6-4), the radiators 100B6 (including radiators 100B6-1, 100B6-3, 100B6-3 and 100B6-4), the radiators 10006 (including radiators 10006-1, 10006-3, 10006-3 and 10006-4) and the radiators 100D6 (including radiators 100D6-1, 100D6-3, 100D6-3 and 100D6-4) is that the radiators 100A6, 100B6, 10006 and 100D6 include the notches N1B at the second edges S2A, S2B, S2C and S2D and the notches N2B at the fourth edges S4A, S4B, S4C and S4D. In addition, the angles $\theta_4$ of the radiators 100A6, 100B6, 10006 and 100D6 is different from the angles $\theta_4$ of the radiators 100A4, 100B4, 100C4 and 100D4.

In some embodiments, the adjacent radiators of the antenna 500 may be asymmetrical along the geometric line GPL1 of the separation gap GP1 or the geometric line GPL2 of the separation gap GP2 (FIG. 1C). For example, the radiators of the antenna 500 may be composed of any four radiators of the radiators 100A1-100A6, 100B1-100B6, 100C1-10006 and 100D1-100D6.

Figure 9:
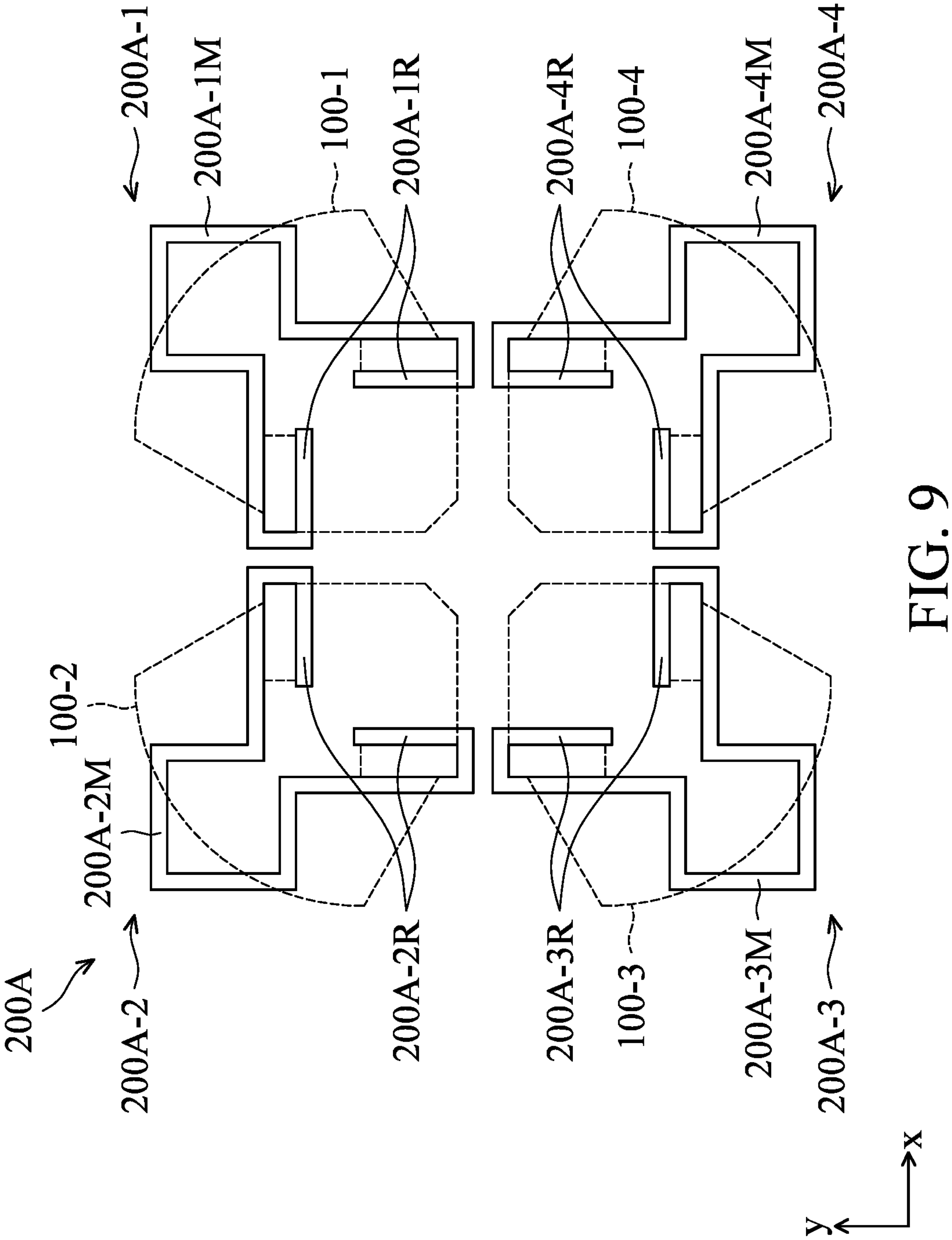
FIG. 9 is a perspective view of conductive parasitic elements of an antenna in accordance with some embodiments of the disclosure.

As shown in FIGS. 1B and 9, the conductive parasitic elements 200 including conductive parasitic elements 200-1, 200-2, 200-3 and 200-4 may be insulated from the radiators 100-1, 100-2, 100-3 and 100-4 and the ground plane 300 and overlapping the radiators 100-1, 100-2, 100-3 and 100-4 in the top view. Each of the conductive parasitic elements 200-1, 200-2, 200-3 and 200-4 may be a planar conductive path positioned between the first level L1 and the second level L2. On xy-plane, the projection of each of the radiators 100-1, 100-2, 100-3 and 100-4 may be clamped between the two gaps GP1 and GP2. In some embodiments, a projection of each of the conductive parasitic elements 200-1, 200-2, 200-3 and 200-4 may also extend between the two gaps GP1 and GP2 which clamp the radiators 100-1, 100-2, 100-3 and 100-4. In addition, the conductive parasitic elements 200-1, 200-2, 200-3 and 200-4 may partially surround the radiators 100-1, 100-2, 100-3 and 100-4. In some embodiments, the conductive parasitic element 200-1/200-2/200-3/200-4 includes a boomerang-shaped middle segment 200-1M/200-2M/200-3M/200-4M between two claw-like radial segments 200-1R/200-2R/200-3R/200-4R pointing toward a center of the corresponding radiator 100-1/100-2/100-3/100-4. In some embodiments, the boomerang-shaped middle segments 200-1M, 200-2M, 200-3M and 200-4M are positioned at a fourth level L4 between the first level L1 and the second level L2 and extending parallel to xy-plane. As shown in FIG. 9, each of the conductive parasitic elements 200-1, 200-2, 200-3 and 200-4 may be configured not to entirely enclose the geometric origin p0. The conductive parasitic elements 200-1, 200-2, 200-3 and 200-4 may help to enhance performances of the antenna 500; e.g., to expand bandwidth, improve impedance matching, reduce any unwanted tilt of radiation directivity, and increase cross-polarization discrimination (XPD).

In some embodiments, the two claw-like radial segments of the conductive parasitic element may clamp the notches of the corresponding radiator to improve impedance matching. FIG. 9 is also a perspective view of conductive parasitic elements 200A (including conductive parasitic elements 200A-1, 200A-2, 200A-3 and 200-A4) of the antenna 500 in accordance with some embodiments of the disclosure. The conductive parasitic element 200A-1/200A-2/200A-3/200A-4 includes a boomerang-shaped middle segment 200A-1M/200A-2M/200A-3M/200A-4M between two claw-like radial segments 200A-1R/200A-2R/200A-3R/200A-4R pointing toward the center of the corresponding radiator 100-1/100-2/100-3/100-4. In some embodiments, the boomerang-shaped middle segments 200A-1M, 200A-2M, 200A-3M and 200A-4M and the claw-like radial segments 200A-1R, 200A-2R, 200A-3R and 200A-4R are positioned at the same level (e.g., the fourth level L4) between the first level L1 and the second level L2. In some embodiments, when the antenna 500 includes the radiators 100A4 having notches N1A, N2A and the conductive parasitic elements 200A, the two claw-like radial segments 200A-1R/200A-2R/200A-3R/200A-4R may clamp the notches N1A, N2A/N1B, N2B, respectively. In addition, the two claw-like radial segments 200A-1R/200A-2R/200A-3R/200A-4R may point toward the center of the radiator 100A4-1/100A4-2/100A4-3/100A4-4 along the extending directions (e.g., extending directions DN1 and DN2) of the notches N1A, N1B/N2A, N2B. Furthermore, portions of the two claw-like radial segments may be not exposed from the notches N1A, N1B/N2A, N2B in the top view as shown in FIG. 9.

Figure 10A:
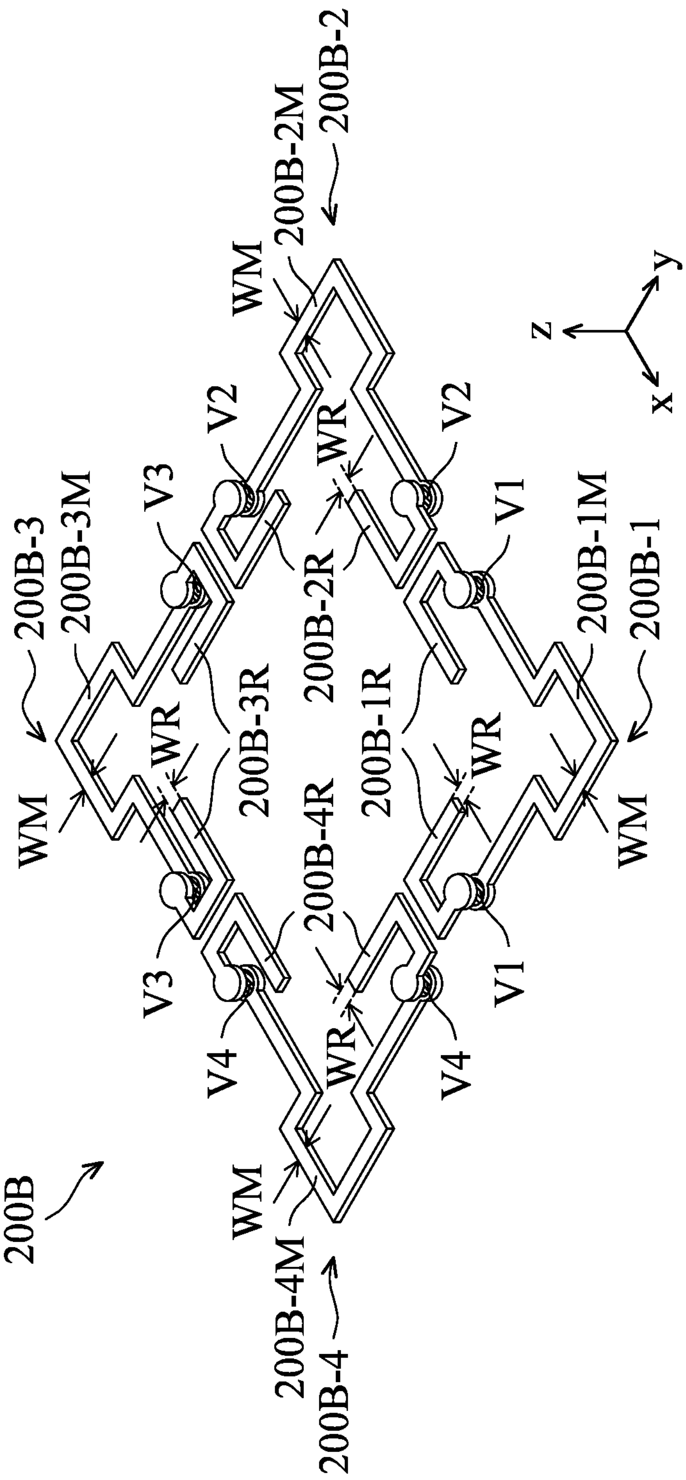
FIG. 10A is a perspective view of conductive parasitic elements of an antenna in accordance with some embodiments of the disclosure.
Figure 10B:
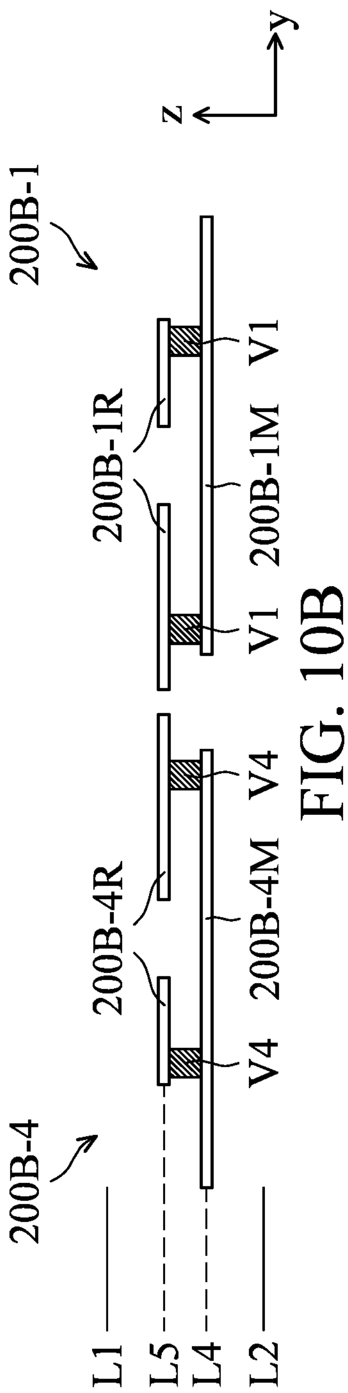
FIG. 10B is a side view of the conductive parasitic elements shown in FIG. 10A in accordance with some embodiments of the disclosure.

In some embodiments, the boomerang-shaped middle segment and the two claw-like radial segments of the same conductive parasitic elements may be positioned at different levels or have different line widths to improve impedance matching. FIG. 10A is a perspective view of conductive parasitic elements 200B (including conductive parasitic elements 200B-1, 200B-2, 200B-3 and 200-B4) of the antenna 500 in accordance with some embodiments of the disclosure. FIG. 10B is a side view of the conductive parasitic elements 200B shown in FIG. 10A in accordance with some embodiments of the disclosure. Elements of the embodiments hereinafter, that are the same or similar as those previously described with reference to FIGS. 1A, 1B and 9 are not repeated for brevity. As shown in FIGS. 10A and 10B, the difference between the conductive parasitic elements 200A and the conductive parasitic elements 200B is that boomerang-shaped middle segments 200B-1M, 200B-2M, 200B-3M and 200B-4M and claw-like radial segments 200B-1R, 200B-2R, 200B-3R and 200B-4R of the conductive parasitic elements 200B are positioned at different levels, so that the claw-like radial segments 200B-1R, 200B-2R, 200B-3R and 200B-4R are positioned between the radiators and the boomerang-shaped middle segments 200B-1M, 200B-2M, 200B-3M and 200B-4M along z-direction. For example, the boomerang-shaped middle segments 200B-1M, 200B-2M, 200B-3M and 200B-4M are positioned at the fourth level L4, and the claw-like radial segments 200B-1R, 200B-2R, 200B-3R and 200B-4R are positioned at a fifth level L5 over the fourth level L4 and between the first level L1 and the fourth level L4. In addition, the claw-like radial segments 200B-1R, 200B-2R, 200B-3R and 200B-4R are connected to the opposite ends of the corresponding boomerang-shaped middle segments 200B-1M, 200B-2M, 200B-3M and 200B-4M by vias V1, V2, V3 and V4. As shown in FIG. 10A, the boomerang-shaped middle segments 200B-1M, 200B-2M, 200B-3M and 200B-4M may have a line width WM, the claw-like radial segments 200B-1R, 200B-2R, 200B-3R and 200B-4R may have a line width WR. In some embodiments, the line width WM is the same as or different from the line width WR. For example, the line width WR may be smaller than the line width WR to improve impedance matching.

Figure 11A:
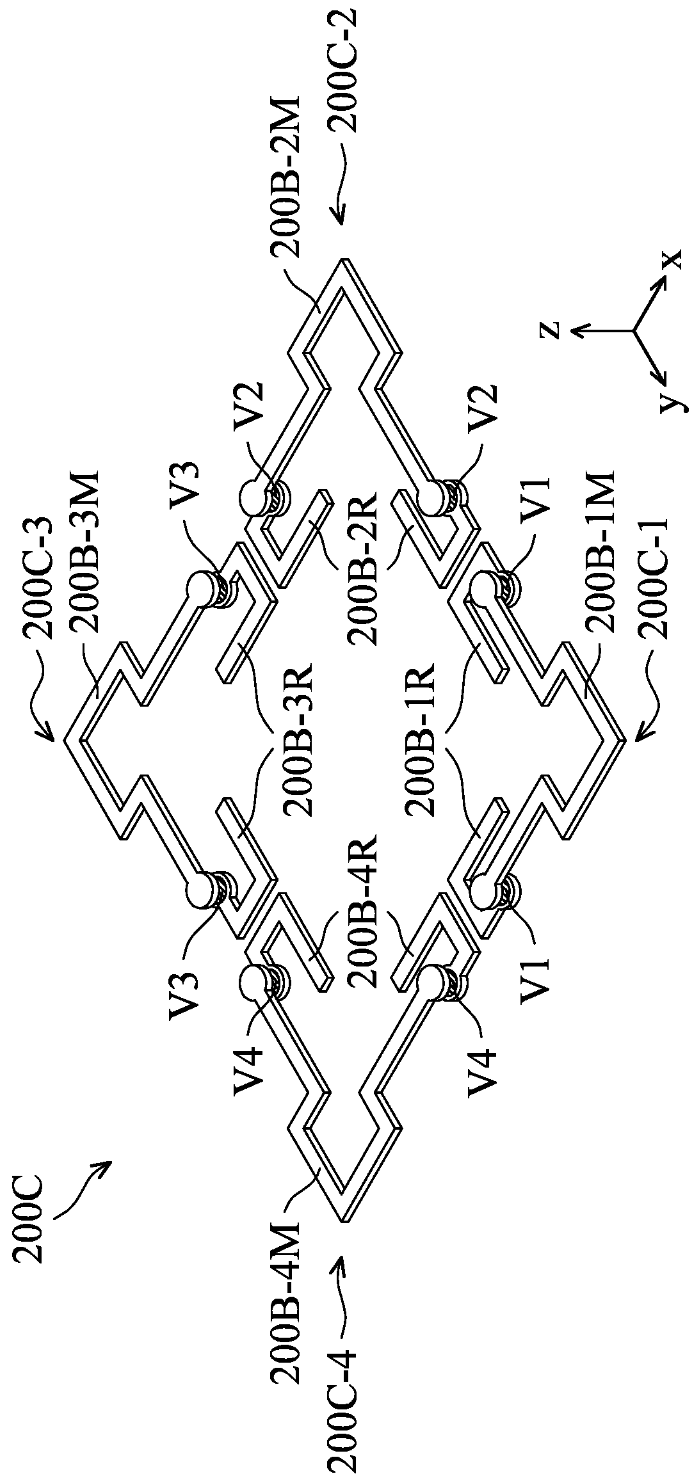
FIG. 11A is a perspective view of conductive parasitic elements of an antenna in accordance with some embodiments of the disclosure.
Figure 11B:
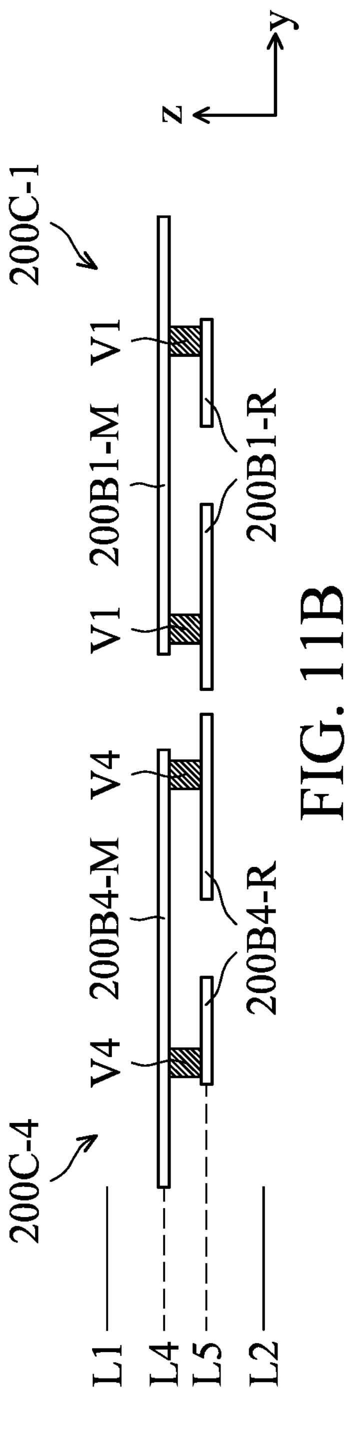
FIG. 11B is a side view of the conductive parasitic elements shown in FIG. 11A in accordance with some embodiments of the disclosure.

FIG. 11A is a perspective view of conductive parasitic elements 200C (including conductive parasitic elements 200C-1, 200C-2, 200C-3 and 200-C4) of the antenna 500 in accordance with some embodiments of the disclosure. FIG. 11B is a side view of the conductive parasitic elements 200C shown in FIG. 11A in accordance with some embodiments of the disclosure. Elements of the embodiments hereinafter, that are the same or similar as those previously described with reference to FIGS. 1A, 1B, 9 and 10A-10B are not repeated for brevity. As shown in FIGS. 11A and 11B, the difference between the conductive parasitic elements 200B and the conductive parasitic elements 200C is that boomerang-shaped middle segments 200B-1M, 200B-2M, 200B-3M and 200B-4M and claw-like radial segments 200B-1R, 200B-2R, 200B-3R and 200B-4R of the conductive parasitic elements 200C are positioned at different levels, so that the boomerang-shaped middle segments 200B-1M, 200B-2M, 200B-3M and 200B-4M are positioned between the radiators and the claw-like radial segments 200B-1R, 200B-2R, 200B-3R and 200B-4R along z-direction. For example, the boomerang-shaped middle segments 200B-1M, 200B-2M, 200B-3M and 200B-4M are positioned at the fourth level L4, and the claw-like radial segments 200B-1R, 200B-2R, 200B-3R and 200B-4R are positioned at a fifth level L5 below the fourth level L4, so that the fourth level L4 is between the first level L1 and the fifth level L5. In addition, the claw-like radial segments 200B-1R, 200B-2R, 200B-3R and 200B-4R are connected to the opposite ends of the corresponding boomerang-shaped middle segments 200B-1M, 200B-2M, 200B-3M and 200B-4M by the vias V1, V2, V3 and V4.

FIGS. 12A-12D are top views of the radiators 100A6, 100B6, 10006 and 100D6 and conductive parasitic elements 200A1 of the antenna 500 in accordance with some embodiments of the disclosure, showing the relative positions of the radiators 100A6, 100B6, 10006 and 100D6 and the corresponding conductive parasitic elements 200A1 of the antenna 500. Elements of the embodiments hereinafter, that are the same or similar as those previously described with reference to FIGS. 1A, 1B, 8A-8D and 9 are not repeated for brevity. In some embodiments, when the antenna 500 includes the radiators 100A6/100B6/100C6/100D6 having notches N1B and N2B and the conductive parasitic elements 200A1, the two claw-like radial segments 200A1-1R/200A1-2R/200A1-3R/200A1-4R may clamp the notches N1B and N2B, respectively.

FIGS. 13A-13D are top views of the radiators 100A6, 100B6, 100C6 and 100D6 and conductive parasitic elements 200B1 (or conductive parasitic elements 200C1) of the antenna 500 in accordance with some embodiments of the disclosure, showing the relative positions of the radiators 100A6, 100B6, 100C6 and 100D6 and the corresponding conductive parasitic elements 200B1 (or the conductive parasitic elements 200C1) of the antenna 500. Elements of the embodiments hereinafter, that are the same or similar as those previously described with reference to FIGS. 1A, 1B, 8A-8D, 10A-10B and 11A-11B are not repeated for brevity. In some embodiments, when the antenna 500 includes the radiators 100A6/100B6/100C6/100D6 having notches N1B and N2B and the conductive parasitic elements 200B1 (or the conductive parasitic elements 200C1), the two claw-like radial segments 200B1-1R/200B1-2R/200B1-3R/200B1-4R may clamp the notches N1B and N2B, respectively.

FIGS. 14A-14D are top views of the radiators 100A4, 100B4, 100C4 and 100D4 and conductive parasitic elements 200A2 of the antenna 500 in accordance with some embodiments of the disclosure, showing the relative positions of the radiators 100A4, 100B4, 100C4 and 100D4 and the corresponding conductive parasitic elements 200A2 of the antenna 500. Elements of the embodiments hereinafter, that are the same or similar as those previously described with reference to FIGS. 1A, 1B, 8A-8D and 9 are not repeated for brevity. In some embodiments, when the antenna 500 includes the radiators 100A4/100B4/100C4/100D4 having notches N1A and N2A and the conductive parasitic elements 200A2, the two claw-like radial segments 200A2-1R/200A2-2R/200A2-3R/200A2-4R may clamp the notches N1A and N2A, respectively.

FIGS. 15A-15D are top views of the radiators 100A4, 100B4, 100C4 and 100D4 and conductive parasitic elements 200B2 (or conductive parasitic elements 200C2) of the antenna 500 in accordance with some embodiments of the disclosure, showing the relative positions of the radiators 100A4, 100B4, 100C4 and 100D4 and the corresponding conductive parasitic elements 200B2 (or the conductive parasitic elements 200C2) of the antenna 500. Elements of the embodiments hereinafter, that are the same or similar as those previously described with reference to FIGS. 1A, 1B, 8A-8D, 10A-10B and 11A-11B are not repeated for brevity. In some embodiments, when the antenna 500 includes the radiators 100A4/100B4/100C4/100D4 having notches N1A and N2A and the conductive parasitic elements 200B2 (or the conductive parasitic elements 200C2), the two claw-like radial segments 200B2-1R/200B2-2R/200B2-3R/200B2-4R may clamp the notches N1A and N2A, respectively.

Figure 12A:
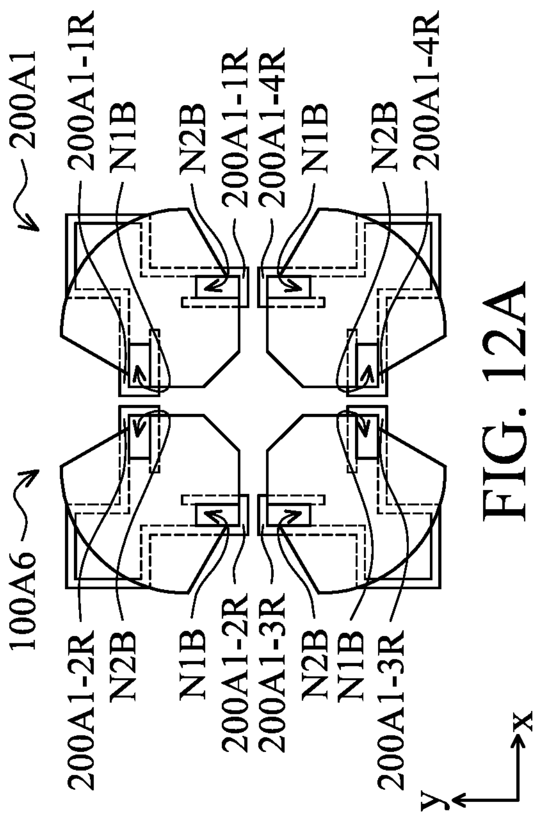
FIGS. 12A-12D are top views of radiators and conductive parasitic elements of an antenna in accordance with some embodiments of the disclosure, showing the relative positions of the radiators and the corresponding conductive parasitic elements of the antenna.
Figure 12B:
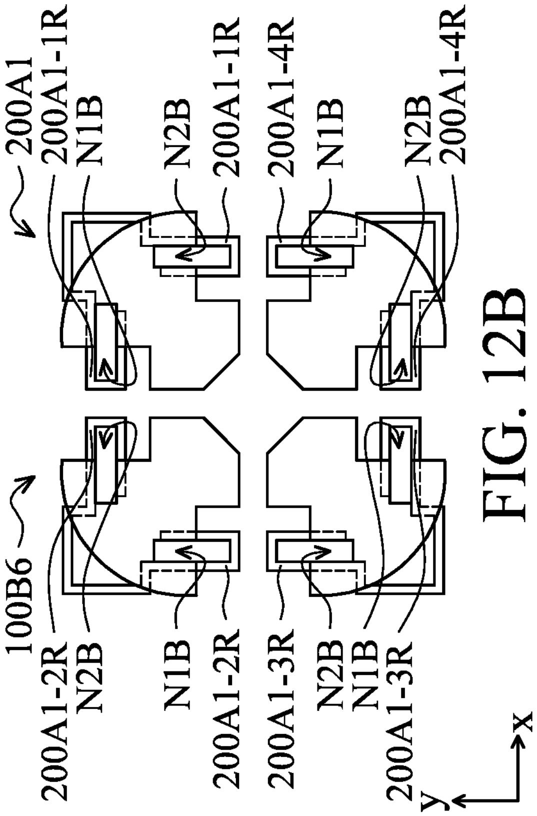
Figure 12C:
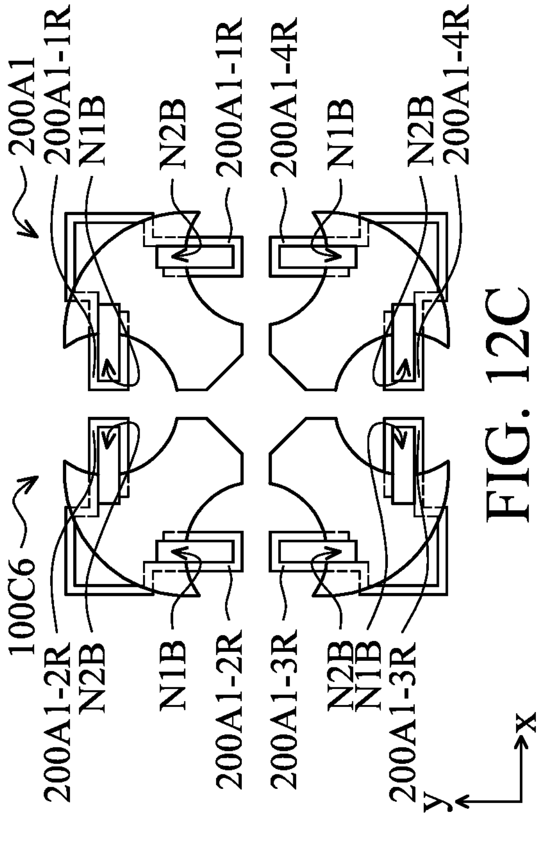
Figure 12D:
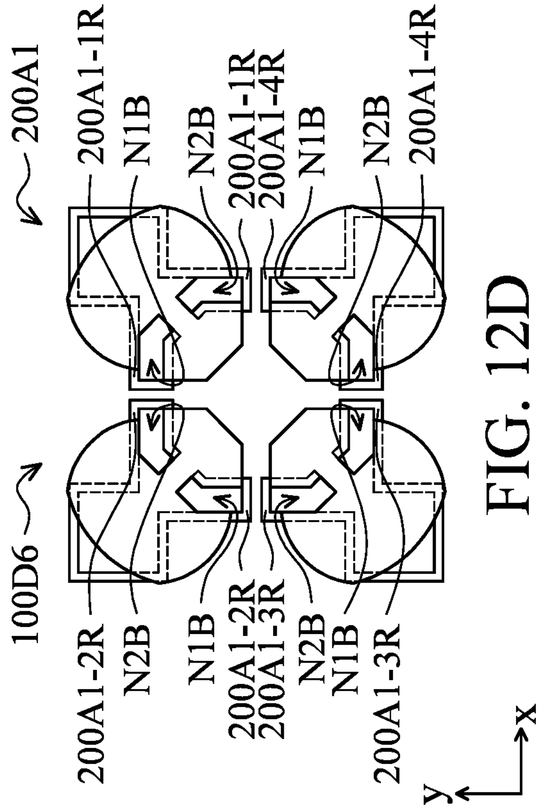
Figure 13A:
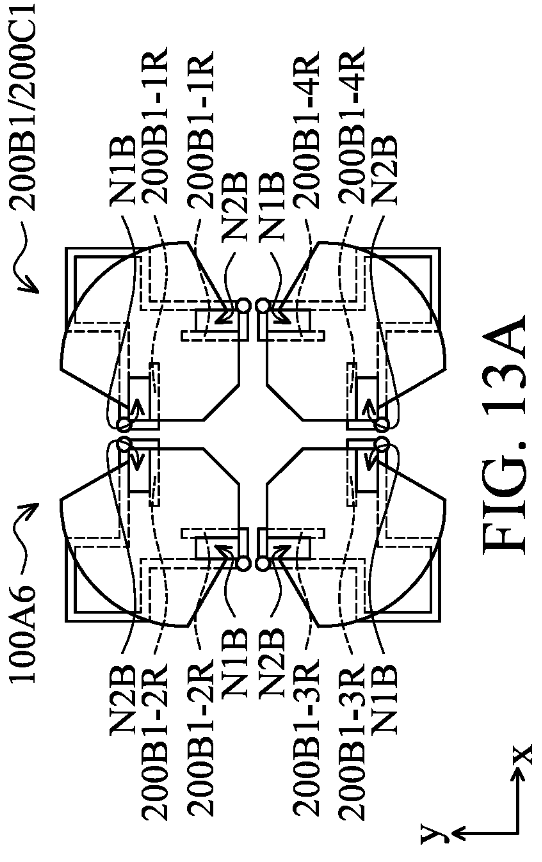
FIGS. 13A-13D are top views of radiators and conductive parasitic elements of an antenna in accordance with some embodiments of the disclosure, showing the relative positions of the radiators and the corresponding conductive parasitic elements of the antenna.
Figure 13B:
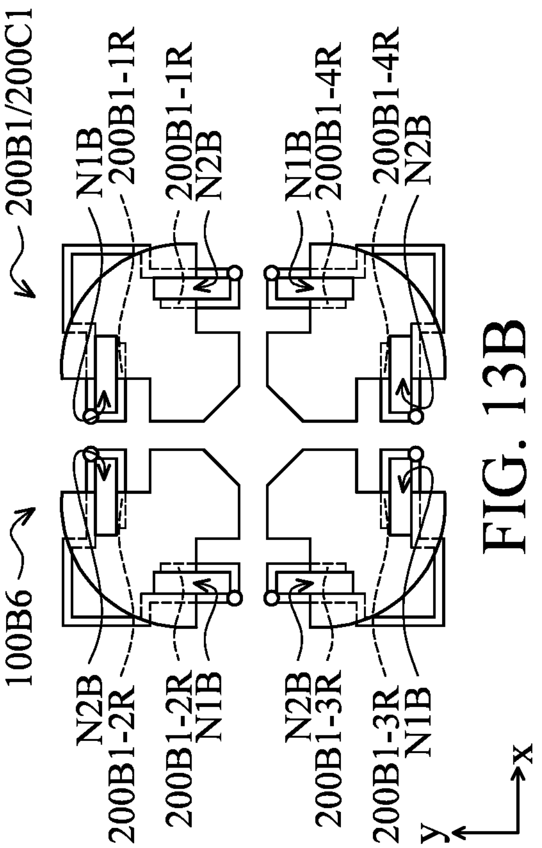
Figure 13C:
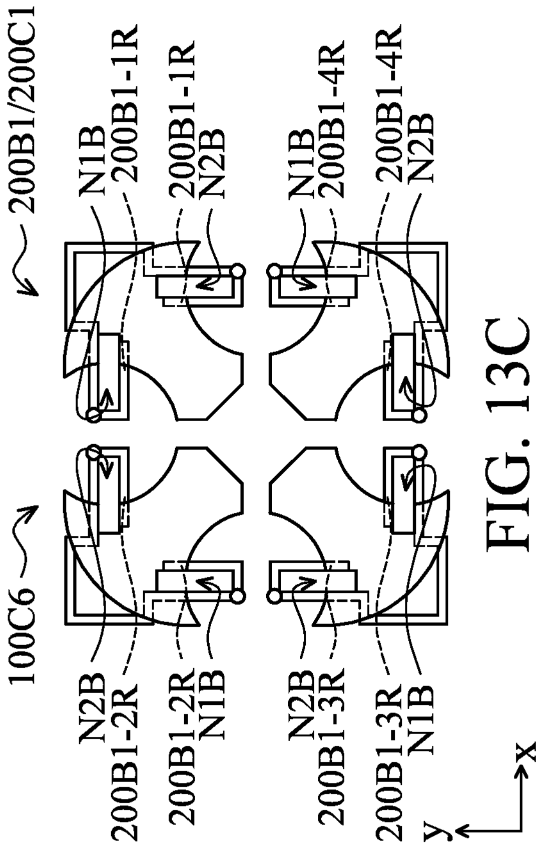
Figure 13D:
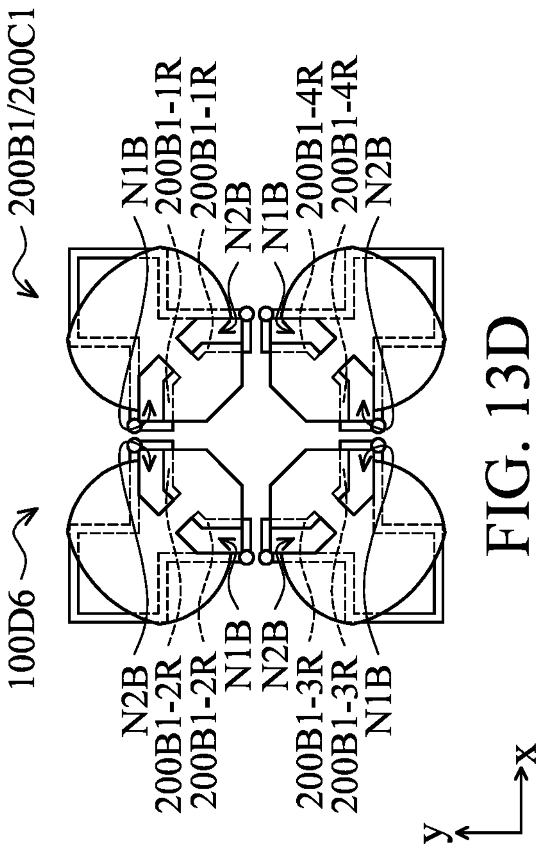
Figure 14A:
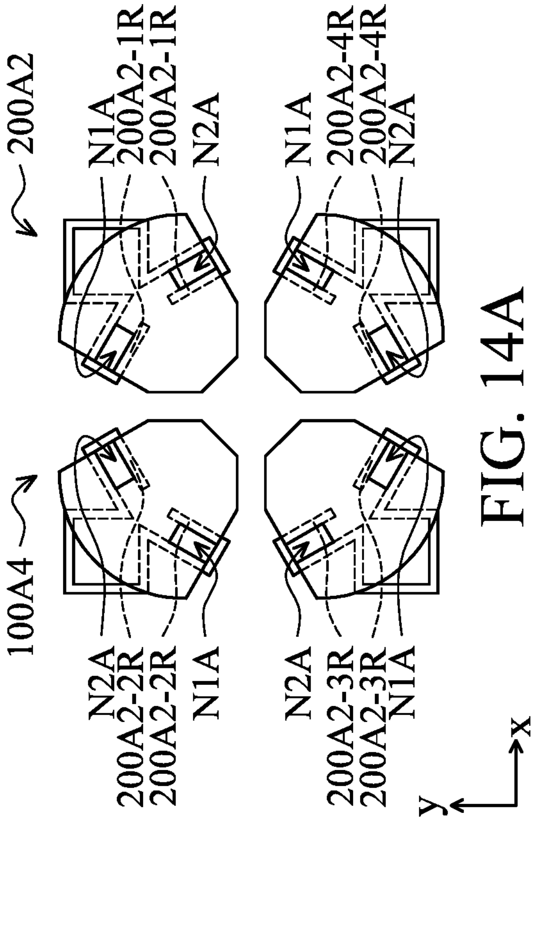
FIGS. 14A-14D are top views of radiators and conductive parasitic elements of an antenna in accordance with some embodiments of the disclosure, showing the relative positions of the radiators and the corresponding conductive parasitic elements of the antenna.
Figure 14B:
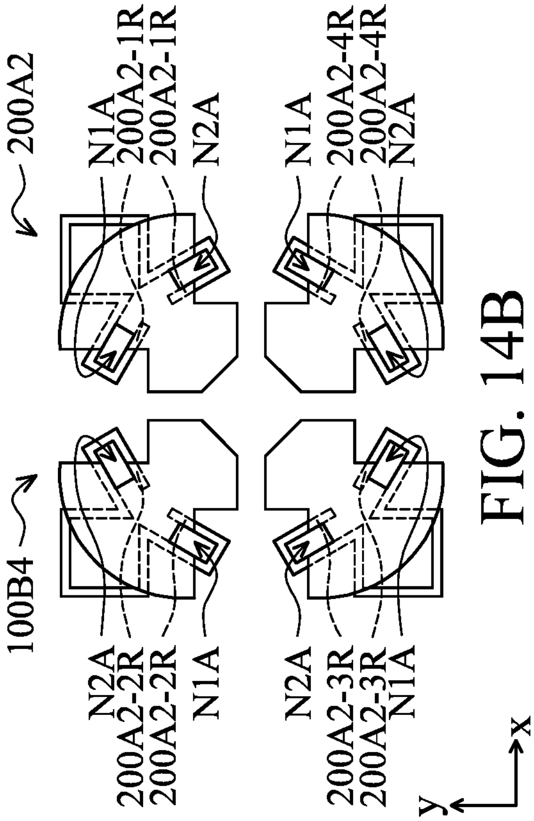
Figure 14C:
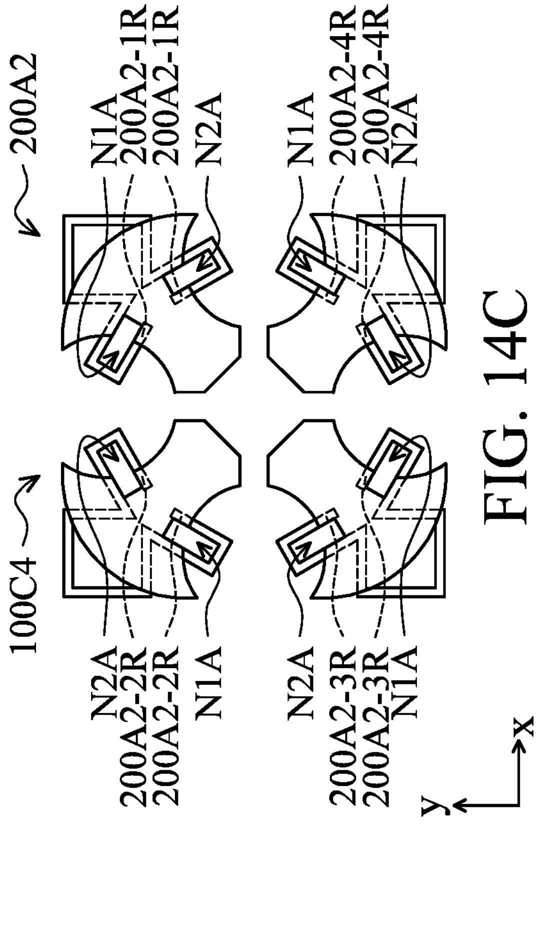
Figure 14D:
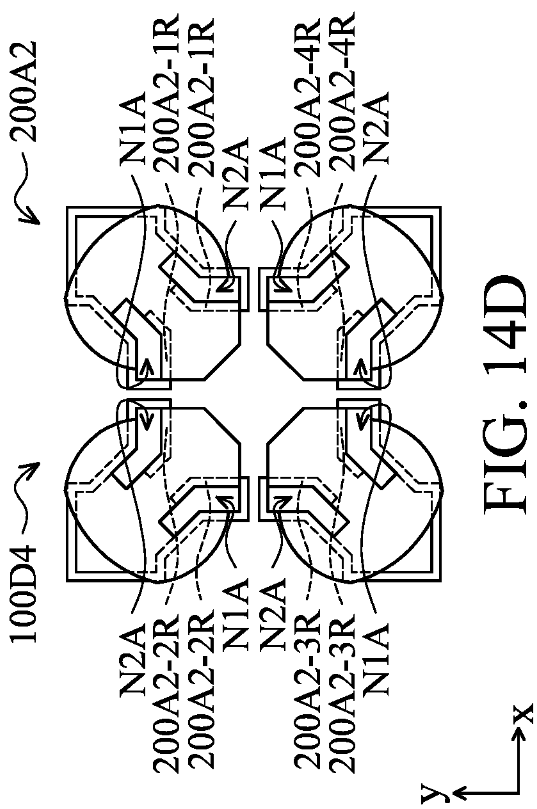
Figure 15A:
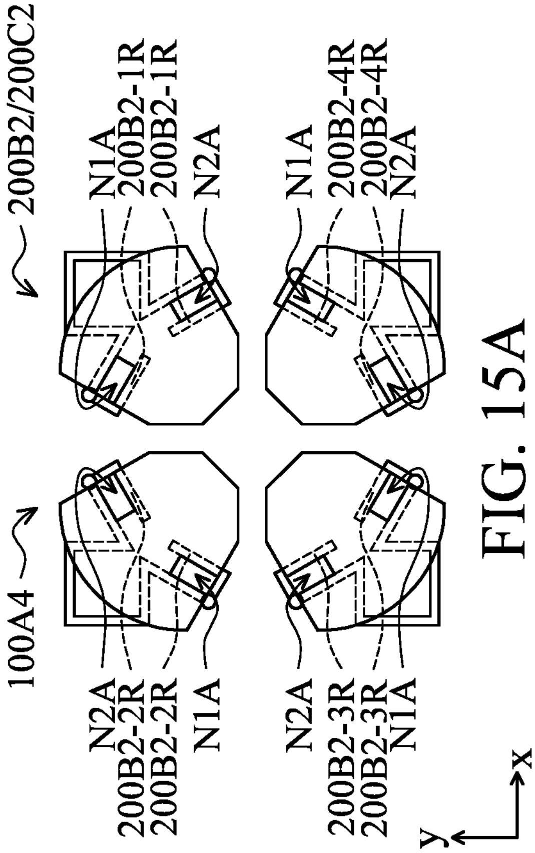
FIGS. 15A-15D are top views of radiators and conductive parasitic elements of an antenna in accordance with some embodiments of the disclosure, showing the relative positions of the radiators and the corresponding conductive parasitic elements of the antenna.
Figure 15B:
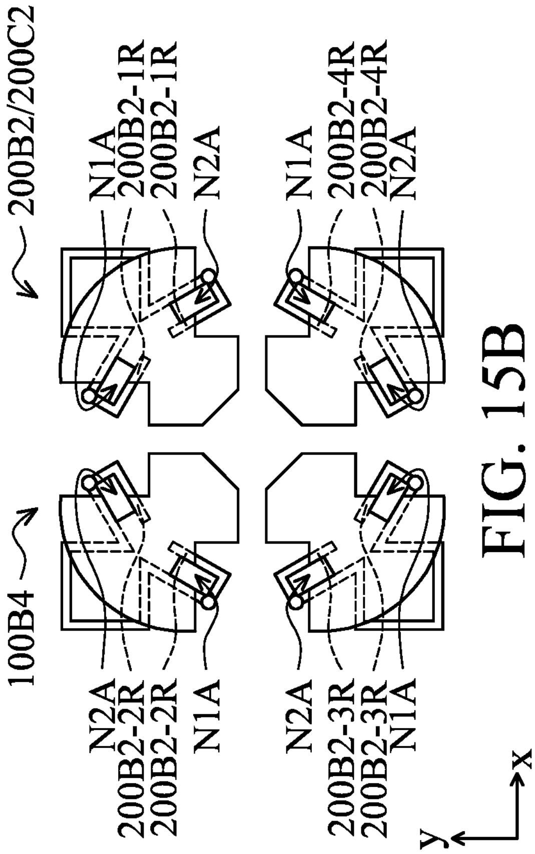
Figure 15C:
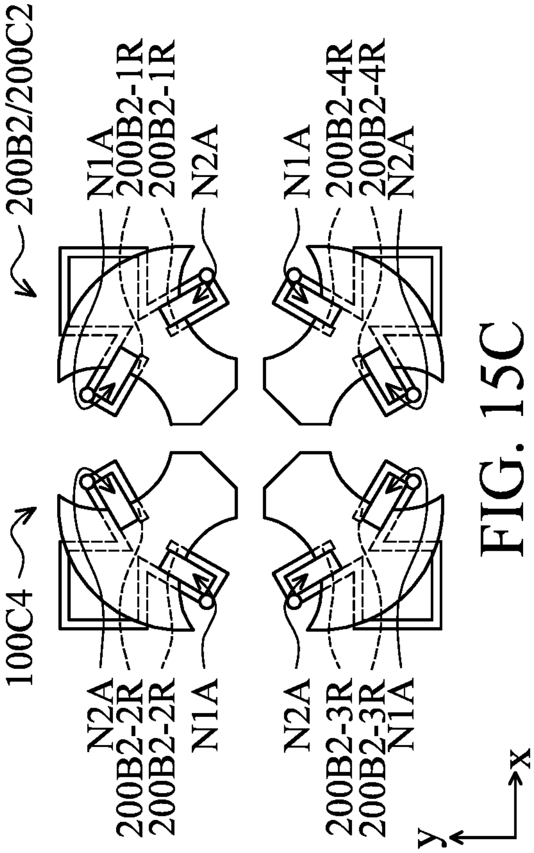
Figure 15D:
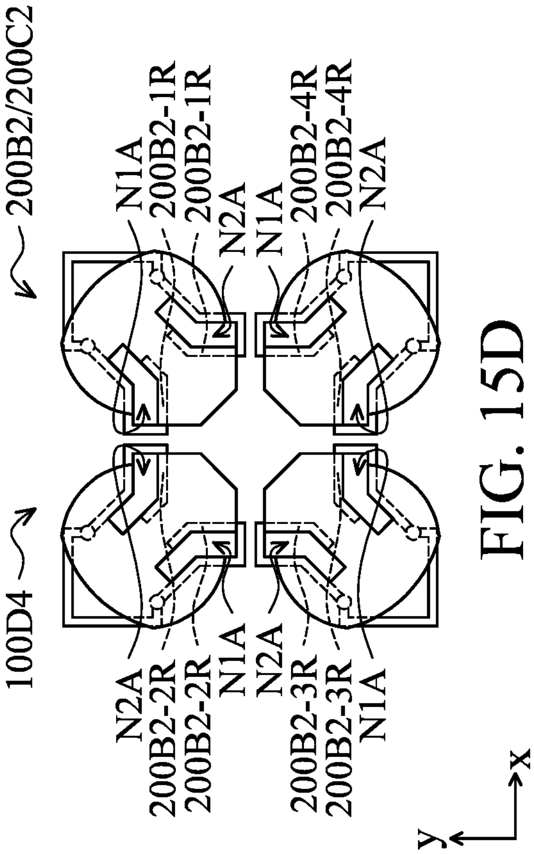
Figure 16B:
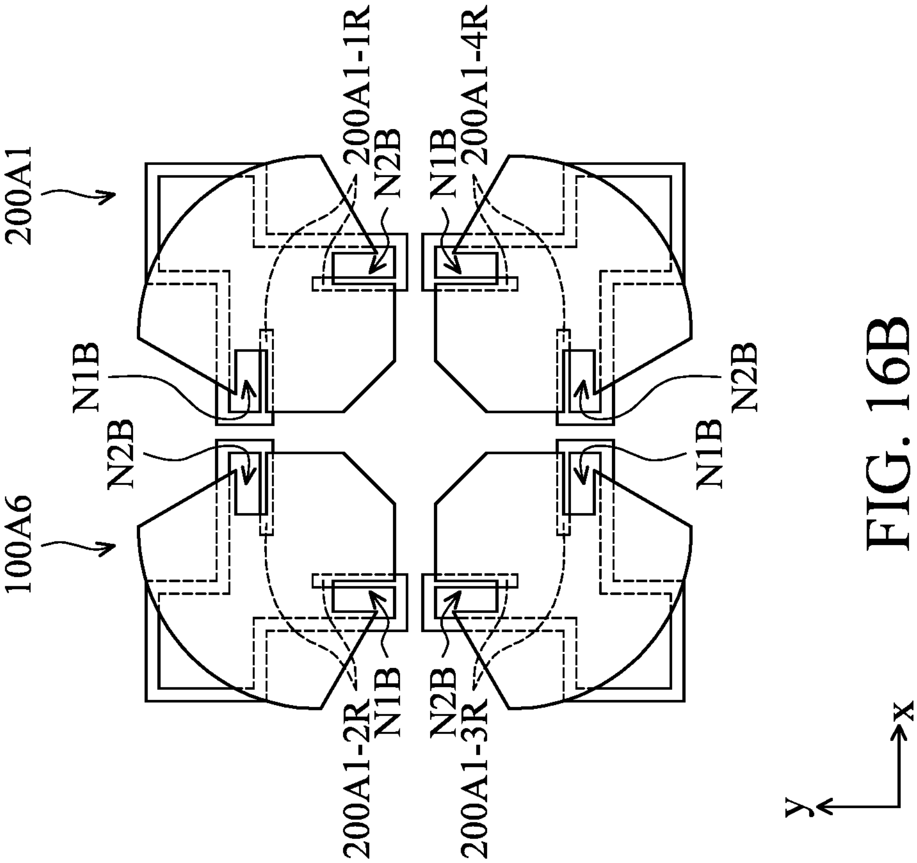
FIGS. 16A and 16B are top views of radiators and conductive parasitic elements of an antenna in accordance with some embodiments of the disclosure, showing the relative positions of the radiators and the corresponding conductive parasitic elements of the antenna.
Figure 16A:
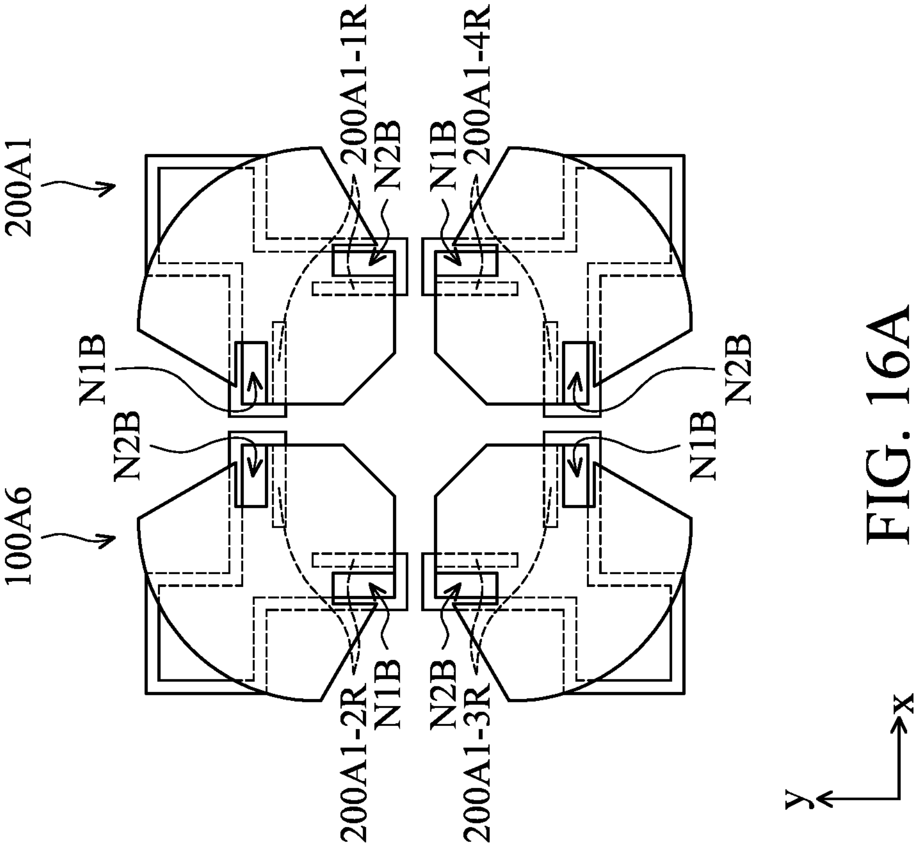

In some embodiments, the conductive parasitic elements may be positioned having the offset relative to the corresponding radiators to adjust impedance matching. FIGS. 16A and 16B are top views of the radiators 100A6 and the conductive parasitic elements 200A2 of the antenna 500 in accordance with some embodiments of the disclosure, showing the relative positions of the radiators 100A6 and the corresponding conductive parasitic elements 200A2 of the antenna 500. Elements of the embodiments hereinafter, that are the same or similar as those previously described with reference to FIG. 12A are not repeated for brevity. In some embodiments, the conductive parasitic elements 200A2 may have an offset in the positive y-direction or negative y-direction. Therefore, portions of the two claw-like radial segments 200A1-1R/200A1-2R/200A1-3R/200A1-4R may be exposed from the notches N1B and N2B of the radiators 100A6 in the top view as shown FIGS. 16A and 16B.

Embodiments provide an antenna for multi-broadband (e.g., dual-broadband) and multi-polarization (e.g., dual-polarization) communication. The antenna may include a ground plane, discrete radiators, conductive parasitic elements and feeding elements. The radiator may be formed from the sector-shaped radiator having the specific radius and the central angle of 90 degrees by removing the two corners where the arc edge and the two radii meet. Therefore, the arc length of the arc edge can be reduced to increase a distance between the arc edges of the adjacent radiators to improve the bandwidth of the high band (HB). In some embodiments, the radiator is formed by removing a portion of the corner close to the central angle of the arc edge. Therefore, the overlapping area between the radiator and the feeding element can be adjusted to change the coupling capacitance for impedance matching. In some embodiments, the radiator has one or more notches (slits) at the edges connected to the arc edge for low band (LB) gain improvement. In some embodiments, the conductive parasitic element may include a boomerang-shaped middle segment and two claw-like radial end segments. The two claw-like radial segments of the conductive parasitic element may clamp the notches of the corresponding radiator to improve impedance matching. The boomerang-shaped middle segment and the two claw-like radial segments of the same conductive parasitic elements may be positioned at different levels or have different line widths to improve impedance matching. In some embodiments, the conductive parasitic element may be positioned having the offset relative to the corresponding radiator in order to adjust impedance matching.

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An antenna, comprising:

a first radiator positioned at a first level and connected to a ground plane at a second level, wherein in a top view, the first radiator has:

a first edge;

a second edge and a third edge connected to opposite ends of the first edge excluding the presence of additional edges between the opposite ends of the first edge and the second edge and the third edge;

a fourth edge connected to an end of the third edge opposite to the first edge excluding the presence of additional edges between the end of the third edge and the fourth edge; and a first arc edge with a first radius having opposite ends respectively connected to the second edge and the fourth edge excluding the presence of additional edges between the opposite ends of the first arc edge and the second edge and the fourth edge, wherein the first arc edge has a first arc length corresponding to a first central angle less than 90 degrees.

2. The antenna as claimed in claim 1, wherein the first edge has a first length less than or equal to 90% of the first radius.

3. The antenna as claimed in claim 1, wherein the first edge and the third edge symmetrical along a first axis of symmetry that is parallel to a radial direction of the first radius and intersects a middle point of the first arc edge.

4. The antenna as claimed in claim 1, wherein the second edge and the fourth edge are symmetrical along a first axis of symmetry that is parallel to a radial direction of the first radius and intersects a middle point of the first arc edge.

5. The antenna as claimed in claim 4, further comprising:

a second radiator at the first level, wherein the second radiator is connected to the ground plane and separated from the first radiator by a gap, wherein the second radiator has a second axis of symmetry, wherein a fourth angle between the first axis of symmetry and the second axis of symmetry is 90, 180 or 270 degrees.

6. The antenna as claimed in claim 5, wherein the gap extends along a geometric line, wherein the first radiator and the second radiator are symmetrical along the geometric line.

7. The antenna as claimed in claim 5, wherein the first radiator further comprises:

a fifth edge having opposite ends respectively connected to the first edge and the third edge, wherein the first axis of symmetry intersects a middle point of the fifth edge.

8. The antenna as claimed in claim 7, further comprising:

a feeding element insulated from the first radiator, the second radiator and the ground plane, wherein the feeding element is positioned at a third level, wherein the third level is positioned between the first level and the second level or aligned with one of the first level and the second level.

9. The antenna as claimed in claim 8, wherein the feeding element extends along the gap.

10. The antenna as claimed in claim 8, wherein the fourth angle between the first axis of symmetry and the second axis of symmetry is 180 degrees, and the feeding element extends along the first axis of symmetry and the second axis of symmetry.

11. The antenna as claimed in claim 10, wherein the feeding element extends below the first radiator from the fifth edge.

12. The antenna as claimed in claim 1, wherein a first angle between the first edge and the third edge is equal to 90 degrees.

13. The antenna as claimed in claim 1, wherein a second angle between the first edge and the second edge is greater than or equal to 90 degrees and less than 180 degrees.

14. The antenna as claimed in claim 1, wherein a third angle between the third edge and the fourth edge is greater than or equal to 90 degrees and less than 180 degrees.

15. The antenna as claimed in claim 1, wherein at least one of the second edge or the fourth edge comprises a linear edge, a curved edge or a bending edge.

16. The antenna as claimed in claim 1, wherein the first radiator has a notch at the second edge.

17. The antenna as claimed in claim 16, wherein a fourth angle between an extending direction of the second edge and an extending direction of the notch is greater than 0 degree and less than 180 degrees.

18. The antenna as claimed in claim 1, further comprising:

a first conductive parasitic element insulated from the first radiator and the ground plane and overlapping the first radiator in the top view, wherein the first conductive parasitic element comprises:

a boomerang-shaped middle segment between two claw-like radial segments pointing toward a center of the first radiator, wherein the boomerang-shaped middle segment is positioned at a fourth level between the first level and the second level.

19. The antenna as claimed in claim 18, wherein the first radiator has a first notch at the second edge and a second notch at the fourth edge, wherein the two claw-like radial segments clamp the first notch and the second notch.

20. The antenna as claimed in claim 19, wherein the two claw-like radial segments point toward the center of the first radiator along extending directions of the first notch and the second notch.

21. The antenna as claimed in claim 19, wherein the two claw-like radial segments are positioned at a fifth level between the first level and the fourth level.

22. The antenna as claimed in claim 18, wherein portions of the two claw-like radial segments are exposed from the first notch and the second notch in the top view.

23. The antenna as claimed in claim 18, wherein the two claw-like radial segments are positioned at a fifth level, wherein the fourth level is positioned between the first level and the fifth level.

24. The antenna as claimed in claim 18, wherein the two claw-like radial segments are positioned at the fourth level.

25. The antenna as claimed in claim 18, wherein the boomerang-shaped middle segment has a first line width, the two claw-like radial segments have a second line width different from the first line width.

26. An antenna, comprising:

separated radiators positioned at a first level and connected to a ground plane at a second level, wherein in a top view, each of the radiators has:

a first edge;

a second edge and a third edge connected to opposite ends of the first edge excluding the presence of additional edges between the opposite ends of the first edge and the second edge and the third edge;

a fourth edge connected to an end of the third edge opposite to the first edge excluding the presence of additional edges between the end of the third edge and the fourth edge; and an arc edge with a first radius having opposite ends respectively connected to the second edge and the fourth edge excluding the presence of additional edges between the opposite ends of the first arc edge and the second edge and the fourth edge, wherein the first edge has a first length less than or equal to 90% of the first radius, wherein an angle between the first edge and the second edge is greater than or equal to 90 degrees and less than 180 degrees.

27. The antenna as claimed in claim 26, further comprising:

conductive parasitic elements insulated from the radiators and the ground plane and overlapping the corresponding radiators in the top view, wherein each of the conductive parasitic elements comprises:

a boomerang-shaped middle segment between two claw-like radial segments pointing toward a center of the corresponding radiator, wherein the boomerang-shaped middle segment and the two claw-like radial segments are positioned at different levels that are between the first level and the second level.

28. An antenna, comprising:

separated radiators positioned at a first level and connected to a ground plane at a second level, wherein in a top view, each of the radiators has:

a first edge;

a second edge and a third edge connected to opposite ends of the first edge excluding the presence of additional edges between the opposite ends of the first edge and the second edge and the third edge;

a fourth edge connected to an end of the third edge opposite to the first edge excluding the presence of additional edges between the end of the third edge and the fourth edge;

an arc edge with a first radius having opposite ends respectively connected to the second edge and the fourth edge excluding the presence of additional edges between the opposite ends of the first arc edge and the second edge and the fourth edge, wherein the first edge has a first length less than or equal to 90% of the first radius, and wherein the first edge extends along a direction that does not intersect the arc edge; and notches at the second edge and the fourth edge.

29. The antenna as claimed in claim 28, further comprising:

conductive parasitic elements insulated from the radiators and the ground plane and overlapping the corresponding radiators in the top view, wherein each of the conductive parasitic elements comprises:

a boomerang-shaped middle segment between two claw-like radial segments pointing toward a center of the corresponding radiator, wherein the two claw-like radial segments clamp the notches in the top view.

* * * * *